(12) United States Patent
Nakatsugawa

(10) Patent No.: US 8,040,842 B2
(45) Date of Patent: Oct. 18, 2011

(54) RADIO COMMUNICATION SYSTEM

(75) Inventor: Keiichi Nakatsugawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1160 days.

(21) Appl. No.: 11/736,187

(22) Filed: Apr. 17, 2007

(65) Prior Publication Data

US 2008/0056172 A1    Mar. 6, 2008

(30) Foreign Application Priority Data

Aug. 31, 2006 (JP) ................................. 2006-234767

(51) Int. Cl.
*H04W 4/00* (2009.01)

(52) U.S. Cl. ........ 370/329; 370/230; 370/278; 370/282; 370/315; 370/328; 455/450; 455/452.1; 455/500; 455/509; 455/92

(58) Field of Classification Search ................. 455/428, 455/450–453, 11.1–13.3, 15, 16, 500, 507, 455/509–513, 515, 561, 92; 370/230–236, 370/278, 280–282, 293–295, 315–327, 328–330, 370/336, 337, 343–348, 436–437, 442–444, 370/458, 459, 478, 492, 498, 501, 395.4–395.42

See application file for complete search history.

(56) References Cited

U.S. PATENT DOCUMENTS

| | | | |
|---|---|---|---|
| 5,898,679 A | | 4/1999 | Brederveld et al. |
| 6,965,568 B1 * | | 11/2005 | Larsen .......................... 370/238 |
| 7,411,919 B2 * | | 8/2008 | Tavli et al. .................... 370/315 |
| 7,561,542 B2 * | | 7/2009 | Alapuranen et al. .......... 370/321 |
| 2002/0089994 A1 * | | 7/2002 | Leach et al. ................... 370/412 |
| 2004/0114545 A1 * | | 6/2004 | Edwards ........................ 370/294 |
| 2005/0068902 A1 * | | 3/2005 | Rath .............................. 370/256 |
| 2006/0203778 A1 * | | 9/2006 | Han et al. ....................... 370/335 |
| 2007/0201392 A1 * | | 8/2007 | Ramachandran ............. 370/315 |
| 2007/0211757 A1 * | | 9/2007 | Oyman ......................... 370/468 |
| 2008/0260000 A1 * | | 10/2008 | Periyalwar et al. ........... 375/133 |

FOREIGN PATENT DOCUMENTS

| | | |
|---|---|---|
| JP | 10-215281 A | 8/1998 |
| JP | 2002-026798 | 1/2002 |

OTHER PUBLICATIONS

Japanese Patent Office "Office Action" issued for corresponding Patent Application No. 2006-234767, dated Jun. 14, 2011. Partial English translation attached.

* cited by examiner

*Primary Examiner* — Rafael Pérez-Gutiérrez
*Assistant Examiner* — Neda Behrooz
(74) *Attorney, Agent, or Firm* — Myers Wolin, LLC

(57) ABSTRACT

A radio communication system for preventing transmission and receiving data from colliding with each other in radio relay communication. The radio communication system includes a plurality of radio base stations each having a scheduler for arranging a schedule of assignment of a slot into which data is to be inserted in a radio frame, a terminal for performing communication with at least one of the radio base stations through a connection, and a relay station for performing relay forwarding of the radio frame exchanged through the connection, the relay station including a scheduler control section for giving an instruction of the schedule to the scheduler. The scheduler control section gives the instruction to the scheduler so as not to generate duplicate slot assignment, in which the whole or a part of data is assigned to the same slot in radio frames sent at the same timing.

16 Claims, 22 Drawing Sheets

BS: RADIO BASE STATION
RS: RELAY STATION
MS: TERMINAL

RADIO COMMUNICATION SYSTEM

CROSS-REFERENCE TO RELATED APPLICATIONS

This application is based upon and claims the benefits of priority from the prior Japanese Patent Application No. 2006-234767, filed on Aug. 31, 2006, the entire contents of which are incorporated herein by reference.

BACKGROUND OF THE INVENTION

1. Field of the Invention

The present invention relates to radio communication systems, and particularly to a radio communication system that performs relay communication by radio.

2. Description of the Related Art

In radio communication systems, communication is generally performed between a terminal and a radio base station connected to an upper network by a wired link. In recent years, systems have attracted attention in which a relay station that performs relay forwarding by radio is introduced between the radio base station and terminal. Since placing the relay station extends a relay possible area, it is possible to extend the communication area and to improve the communication throughput of the terminal.

FIG. 18 shows an outline of radio relay communication. A relay station 1a and a radio base station 2a are connected by radio, and the relay station 1a and a terminal 3 are connected by radio. The relay station 1a serves as a terminal with respect to the radio base station 2a, and the relay station 1a serves as a radio base station with respect to the terminal 3.

The relay station 1a receives a radio signal sent from the radio base station 2a or the terminal 3 temporarily, performs necessary processing, and sends the signal to the terminal 3 or to the radio base station 2a. Radio relay communication standards include, for example, IEEE 802.16 (WiMAX). In WiMAX, it is expected that the relay communication function will be extended as a mobile multihop relay (MMR).

FIG. 19 shows one type of network in radio relay communication. There are three communication areas A1 to A3. The communication area A1 includes a radio base station 2a-1 and a terminal 3-2, the communication area A2 includes a radio base station 2a-2 and a terminal 3-3, and the communication area A3 includes a terminal 3-1.

Since each unit in the communication areas A1 to A3 share a relay station 1a, a radio communication carrier can extend the communication areas in a step-wise manner while suppressing facility cost by the use of a small number of relay stations.

FIG. 20 shows a state in which connections have been established. When the terminal 3-1 wants to communicate with the radio base stations 2a-1 and 2a-2 through the relay station 1a, the terminal 3-1 establishes a connection C1 with the radio base station 2a-1 to perform communication and establishes a connection C2 with the radio base station 2a-2 to perform communication.

FIG. 21 shows a state in which connections have been established in a network in radio relay communication. A communication area A1 includes a radio base station 2a-1, a communication area A2 includes a radio base station 2a-2, and a communication area A3 includes terminals 3-3 and 3-4. Each unit shares a relay station 1a to perform communication.

In this case, the terminal 3-3 establishes a connection C3 with the radio base station 2a-1 to perform communication, and the terminal 3-4 establishes a connection C4 with the radio base station 2a-2 to perform communication. In either case of FIG. 20 and FIG. 21, the relay station 1a intervenes between the radio base stations and terminals to manage data and control messages sent and received through each connection.

In a conventional radio relay technology, only when a notice indicating that a destination terminal station has not received a message is issued, a radio relay station selectively re-generates the message received from a source terminal station (for example, see paragraph Nos. 0018 to 0033 and FIG. 1 in Japanese Unexamined Patent Application Publication No. Hei-10-215281).

In the above-described conventional networks, where the relay station 1a performs radio relay communication with a plurality of radio base stations, however, the following problems may occur.

When a radio base station sends data to a destination terminal through a connection established, the radio base station performs scheduling to assign a slot (a slot means a position (field) where data or control information is inserted in a frame) in a radio frame, inserts data into the slot, and generates a transmission frame to perform transmission. Each radio base station independently performs such operations for every frame according to a traffic state through a connection managed by the radio base station.

When a plurality of connections are connected to different radio base stations through a single relay station, as shown in FIG. 20 and FIG. 21, data sent from the radio base stations may collide with each other when the relay station receives the data.

FIG. 22 shows a data collision state in the network shown in FIG. 20. When the radio base station 2a-1, which is the destination of the connection C1, and the radio base station 2a-2, which is the destination of the connection C2, assign the whole or a part of transmission data to the same slot in radio frames to be transmitted at the same timing, as a schedule of the transmission data to be sent to the terminal 3-1, the relay station 1a receives both frames, sent from the radio base stations 2a-1 and 2a-2, with the whole or a part of the different transmission data overlapping (with data collision happening), and cannot correctly demodulate the received frames.

The same problem may occur also in the network shown in FIG. 21, where the destinations of the connections C3 and C4 are the different terminals 3-3 and 3-4, because the relay station 1a is shared.

Especially in a WiMAX system, a radio base station performs scheduling to assign a downlink transmission slot sent from the radio base station to a terminal and an uplink transmission slot sent from the terminal to the radio base station.

Therefore, when a relay station, instead of a terminal, performs uplink data transmission to a plurality of radio base stations, scheduling may be performed such that uplink transmission data is assigned to the whole or a part of the same slot in frames to be sent at the same timing from some of the plurality of relay stations. In that case, since the relay station cannot send different data to different radio base stations by using the same slot, the uplink transmission data cannot be sent through each connection at the designated slot.

SUMMARY OF THE INVENTION

In view of the foregoing, the present invention has been made. An object of the present invention is to provide a radio communication system that performs control such that data does not collide with each other during transmission and receiving when a relay station performs radio relay communication with a plurality of radio base stations, to improve radio communication quality.

To accomplish the above object, according to the present invention, there is provided a radio communication system that performs relay communication by radio. This radio communication system includes a plurality of radio base stations each having a scheduler for arranging a schedule of assignment of a slot into which data is to be inserted in a radio frame; a terminal for performing communication with at least one of the radio base stations through a connection; and a relay station for performing relay forwarding of the radio frame exchanged through the connection, the relay station having a scheduler control section for giving an instruction of the schedule to the scheduler. The scheduler control section gives the instruction to the scheduler so as not to generate duplicate slot assignment, in which the whole or a part of data is assigned to the same slot in radio frames sent at the same timing.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
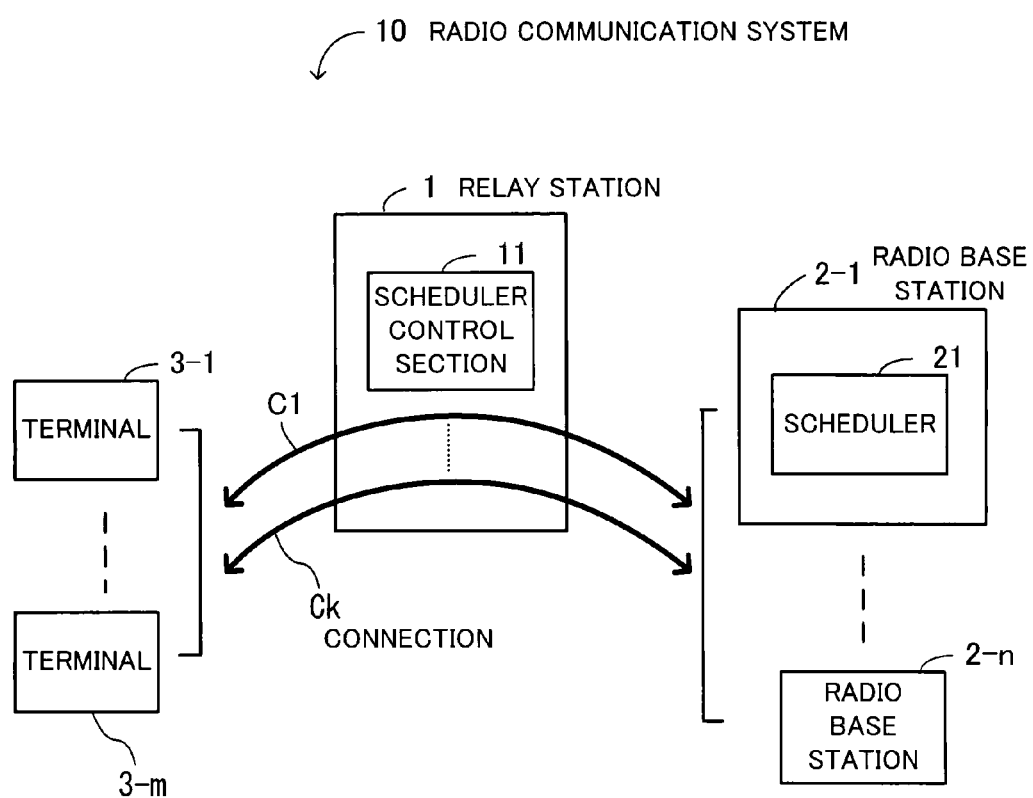
FIG. 1 is a view showing a concept of a radio communication system.

An embodiment of the present invention will be described below by referring to the drawings.

FIG. 1 shows a principle of a radio communication system 10. The radio communication system 10 is formed of a relay station 1, radio base stations 2-1 to 2-$n$ (collectively called a radio base station 2), and terminals 3-1 to 3-$m$ (collectively called a terminal 3), and performs relay communication by radio.

Each of the radio base stations 2-1 to 2-$n$ includes a scheduler 21. The scheduler 21 arranges a schedule of assignment of a slot into which data is to be inserted, in a radio frame. The terminals 3-1 to 3-$m$ perform communication with the radio base stations 2-1 to 2-$n$ through connections C1 to Ck. The relay station 1 includes a scheduler control section 11 that gives an instruction of the schedule to the scheduler 21, and performs relay forwarding of radio frames exchanged through the connections C1 to Ck.

The scheduler control section 11 gives an instruction to the scheduler 21 so as not to produce duplicate slot assignment, which means that the whole or a part of data is assigned to the same slot in radio frames sent at the same timing.

In the present invention, a schedule means an expected-in-advance slot-assignment pattern in which data is assigned to a slot, and includes slot-assignment-pattern switching in units of frames and data mapping on frames to be sent at the same timing (detailed operations thereof will be described later).

The structures of the relay station 1 and the radio base station 2 will be described next.

Figure 2:
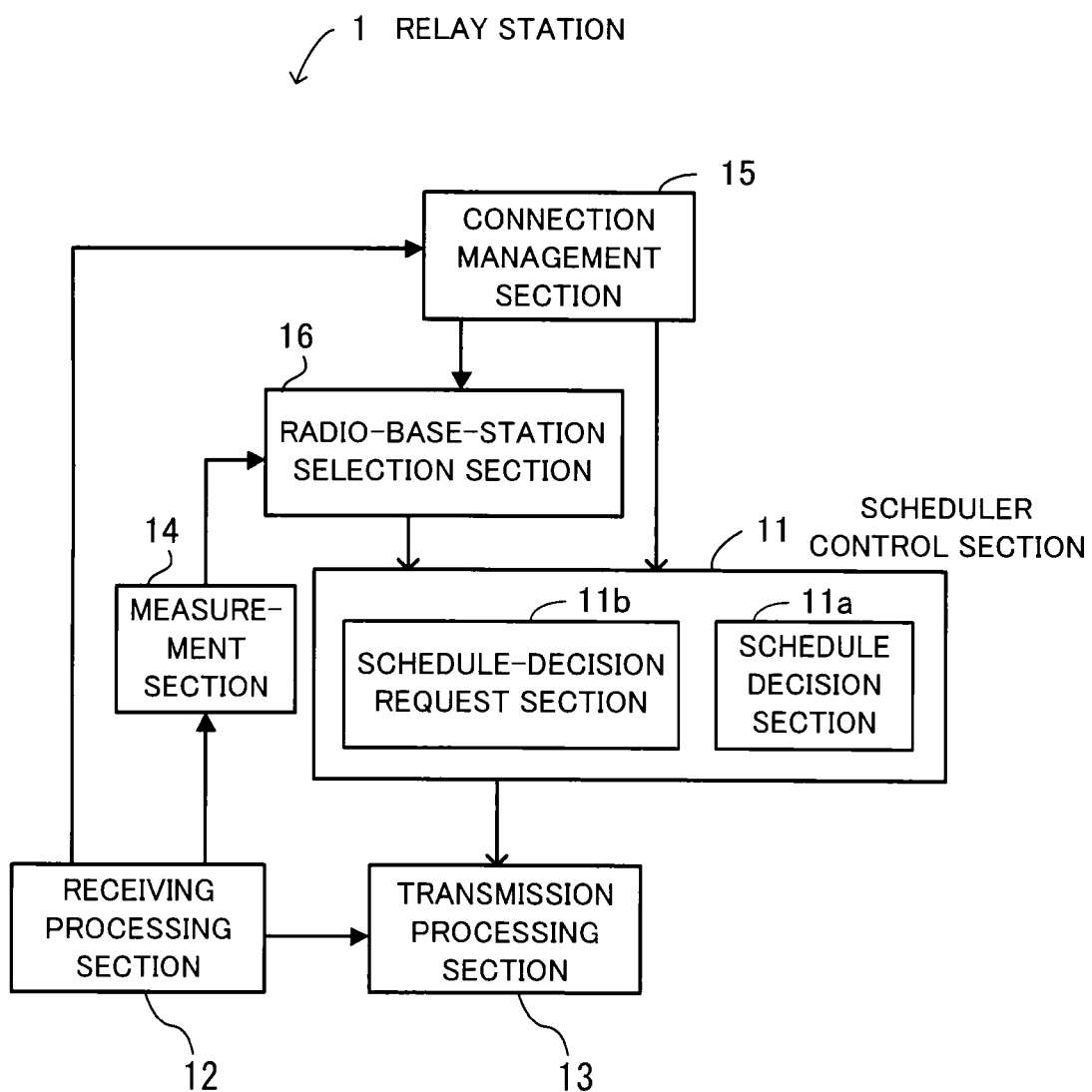
FIG. 2 is a block diagram showing the structure of a relay station.

FIG. 2 is a block diagram of the relay station 1. The relay station 1 is formed of a receiving processing section 12, a transmission processing section 13, a measurement section 14, a connection management section 15, a radio-base-station selection section 16, and the scheduler control section 11.

The receiving processing section 12 receives a radio frame sent from the radio base station 2 or the terminal 3 and performs processing such as demodulation and data extraction. The transmission processing section 13 generates a radio frame to be sent to the radio base station 2 or to the terminal 3, performs processing such as data storage or modulation, and sends the radio frame. The transmission processing section 13 also sends an instruction signal generated by the scheduler control section 11 to the radio base station 2.

The measurement section 14 measures, collects, and manages the receiving quality of a radio frame received by the receiving processing section 12 or the operation state (such as a radio-resource use rate and the number of connections established) of the radio base station 2, sent from the radio base station 2, as communication and connection states with the radio base station 2.

Measurement parameters include, for example, a received-signal strength indicator (RSSI), a carrier to interference and noise ratio (CINR), a traffic congestion level at each base station, and the number of connections established.

The connection management section 15 manages information on each connection established by the terminal 3 connected to the relay station 1, such as an identifier, a traffic parameter, and a connection-destination radio base station 2.

The radio-base-station selection section 16 selects a connection-destination radio base station 2 for each connection with the quality of a radio channel with the radio base station 2 and the operation state of the radio base station 2, measured and collected by the measurement section 14, and the traffic parameter of the connection, managed by the connection management section 15, being taken into account.

The scheduler control section 11 includes a schedule decision section 11a and a schedule-decision request section 11b. When the relay station 1 determines a schedule, the schedule decision section 11a determines a slot assignment schedule for data transmission and receiving, to be specified for the radio base station selected for each connection. When the radio base station 2 determines a schedule, the schedule-decision request section 11b asks the radio base station 2 to determine a slot assignment condition for data transmission and receiving, to be specified for the radio base station selected for each connection.

Figure 3:
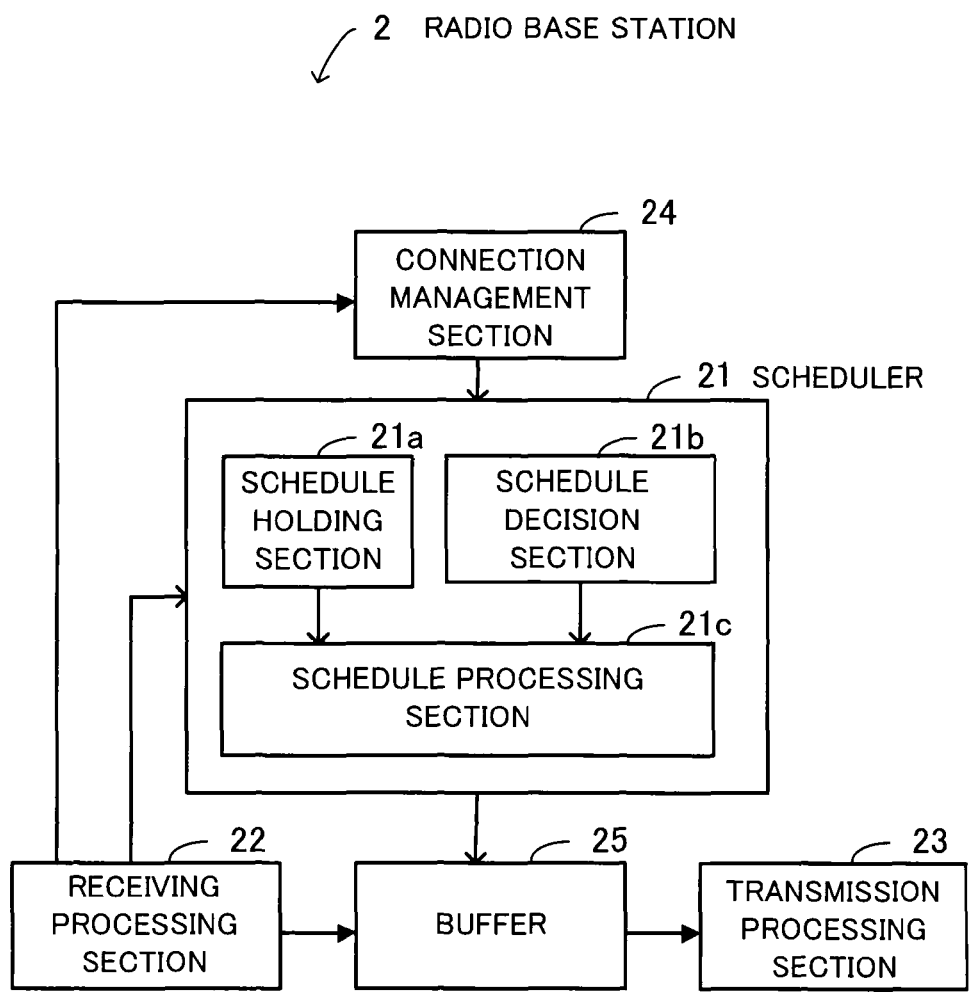
FIG. 3 is a block diagram showing the structure of a radio base station.

FIG. 3 is a block diagram of the radio base station 2. The radio base station 2 is formed of a receiving processing section 22, a transmission processing section 23, a connection management section 24, the scheduler 21, and a buffer 25.

The receiving processing section 22 receives a radio frame sent from an upper network, the relay station 1, or the terminal 3 and performs processing such as demodulation and data extraction. The receiving processing section 22 also receives a schedule instruction sent from the relay station 1. The transmission processing section 23 generates a radio frame to be sent to an upper network, the relay station 1, or to the terminal 3, performs processing such as data storage or modulation, and sends the radio frame.

The connection management section 24 manages information on each connection established by the terminal 3 connected to the relay station 1, such as an identifier, a traffic parameter, and a connection-destination radio base station.

The scheduler 21 includes a schedule holding section 21a, a schedule decision section 21b, and a schedule processing section 21c. The schedule holding section 21a holds the slot assignment schedule specified by the relay station 1. The schedule decision section 21b determines a slot assignment schedule for a connection requested by the relay station 1. During the determination, the schedule decision section 21b negotiates with other radio base stations through the transmission processing section 23. The schedule processing section 21c generates a radio frame and assigns a slot, based on an assignment condition and connection information.

Until data for a connection received by the receiving processing section 22 is stored in a radio frame and sent, the buffer 25 temporarily stores the data.

Next, schedule control for data transmission and receiving in the radio communication system 10 will be described in detail. The relay station 1 and the plurality of radio base stations 2-1 to 2-n control a schedule for data transmission and receiving such that slots to be assigned to connections through which communication is made via the relay station 1 do not collide.

Figure 4:
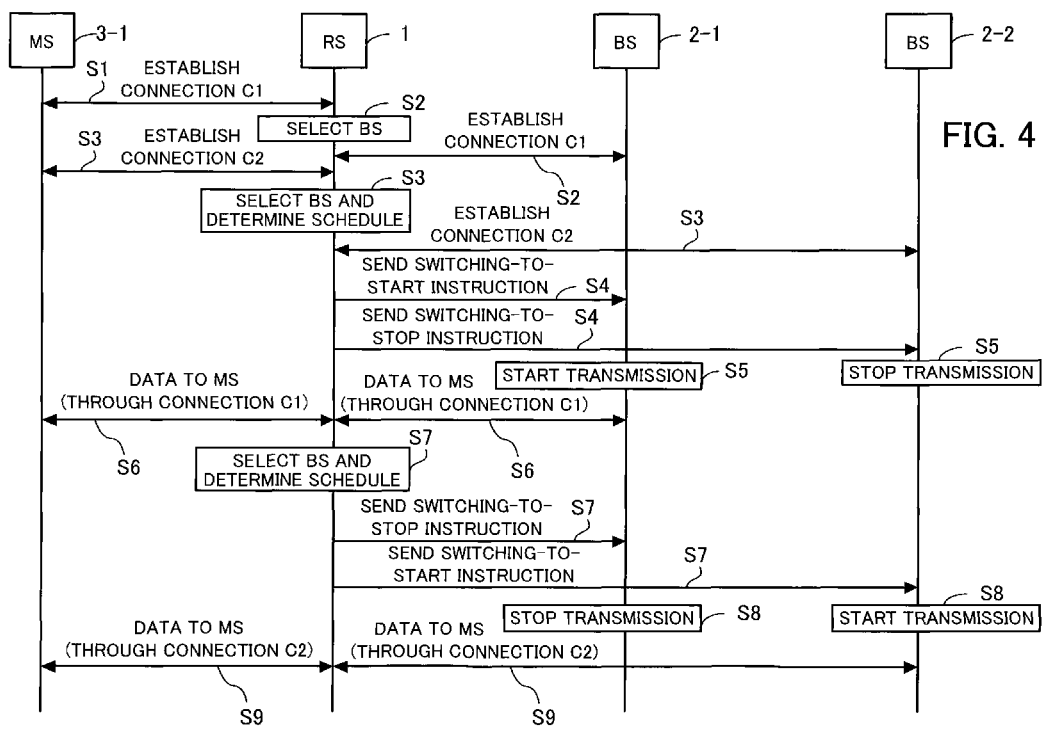
FIG. 4 is a sequence chart showing schedule control for data transmission and receiving.
Figure 5:
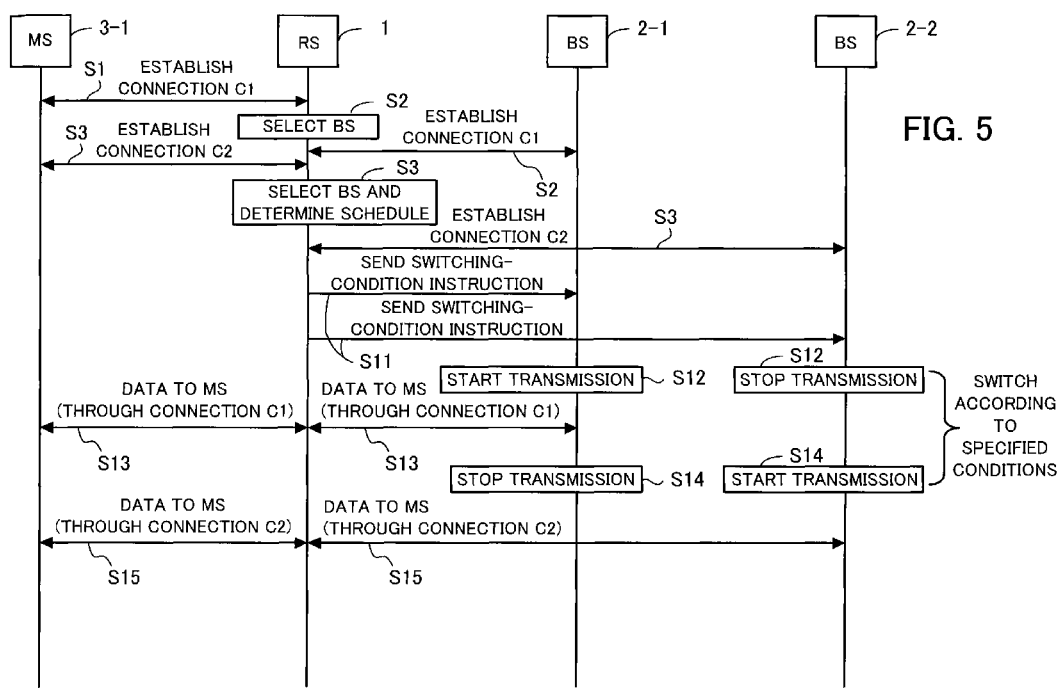
FIG. 5 is a sequence chart showing another schedule control for data transmission and receiving.
Figure 6:
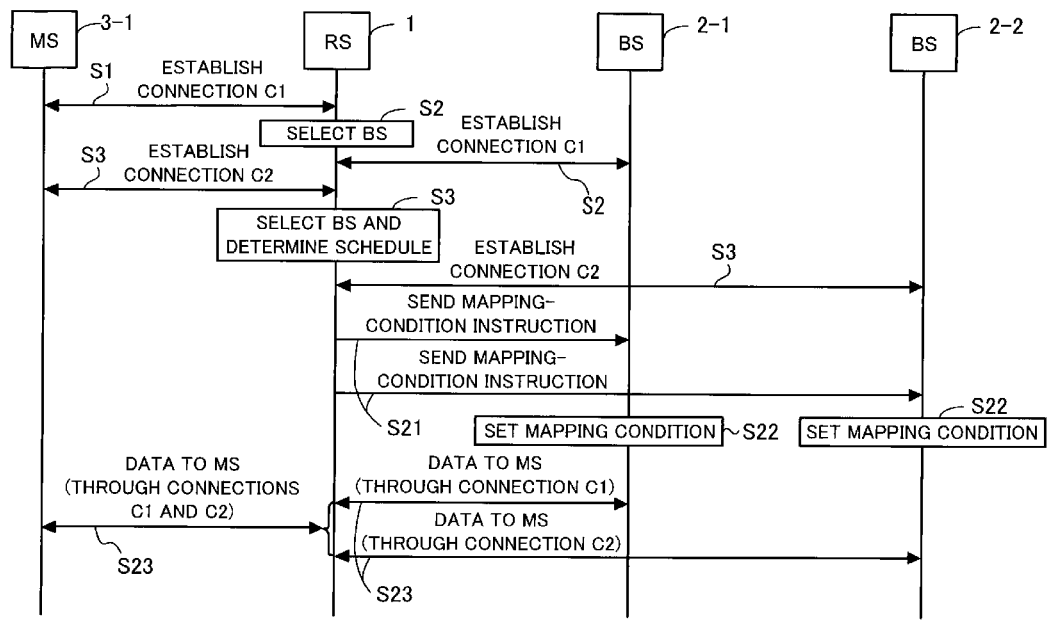
FIG. 6 is a sequence chart showing another schedule control for data transmission and receiving.
Figure 7:
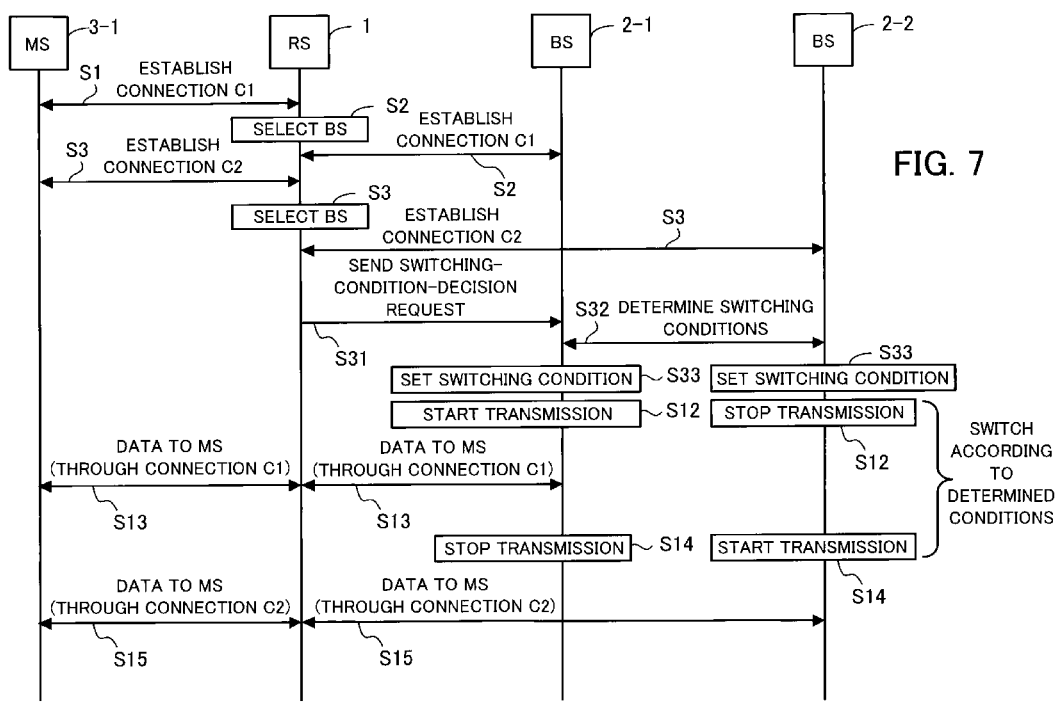
FIG. 7 is a sequence chart showing another schedule control for data transmission and receiving.
Figure 8:
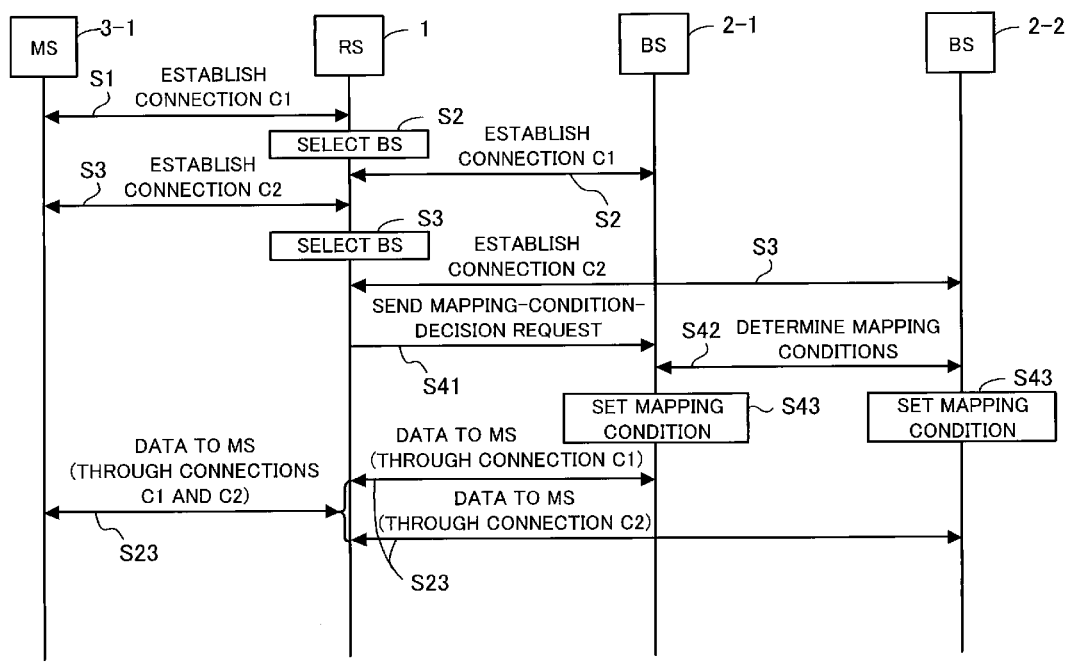
FIG. 8 is a sequence chart showing another schedule control for data transmission and receiving.

Schedule control is performed in one of two methods. In a first method, the relay station 1 determines a schedule and instructs the radio base stations 2-1 to 2-n. In a second method, the relay station 1 asks the radio base stations 2-1 to 2-n to determine a schedule and the radio base stations 2-1 to 2-n determine the schedule. FIG. 4 to FIG. 6 are sequence charts showing schedule control in the first method, and FIG. 7 and FIG. 8 are sequence charts showing schedule control in the second method.

Figure 20:
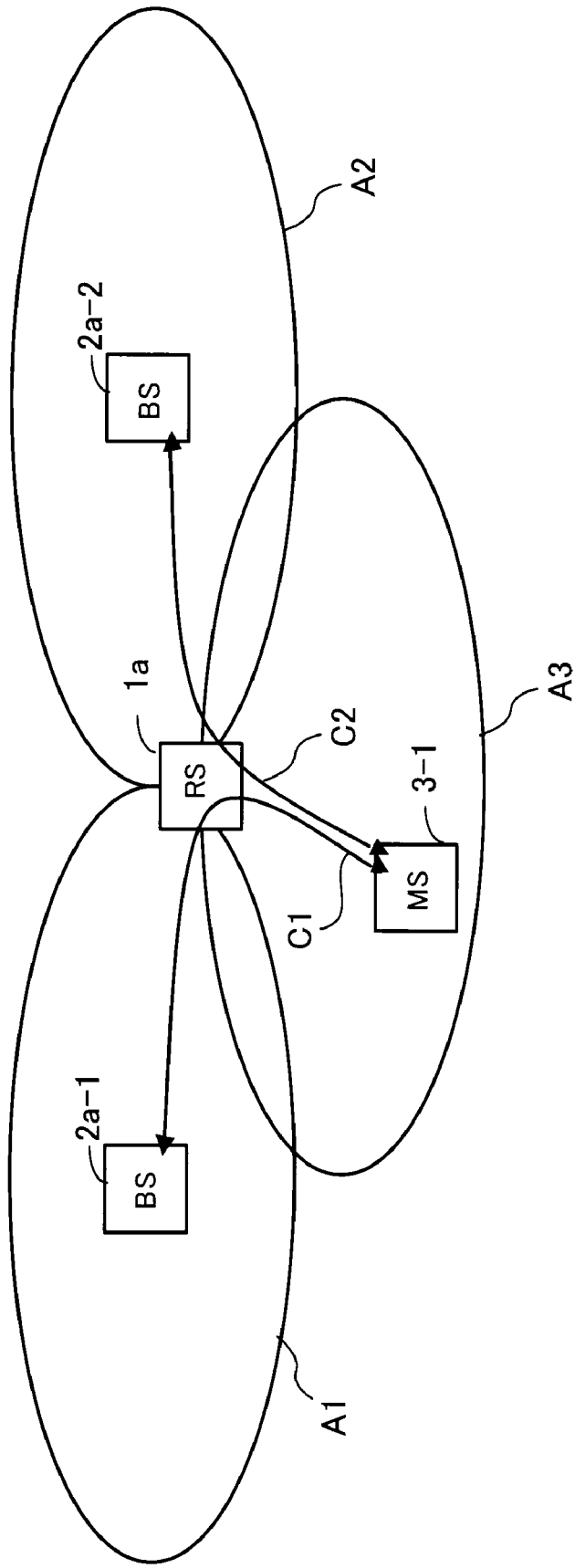
FIG. 20 is a view showing a state in which connections have been established.
Figure 21:
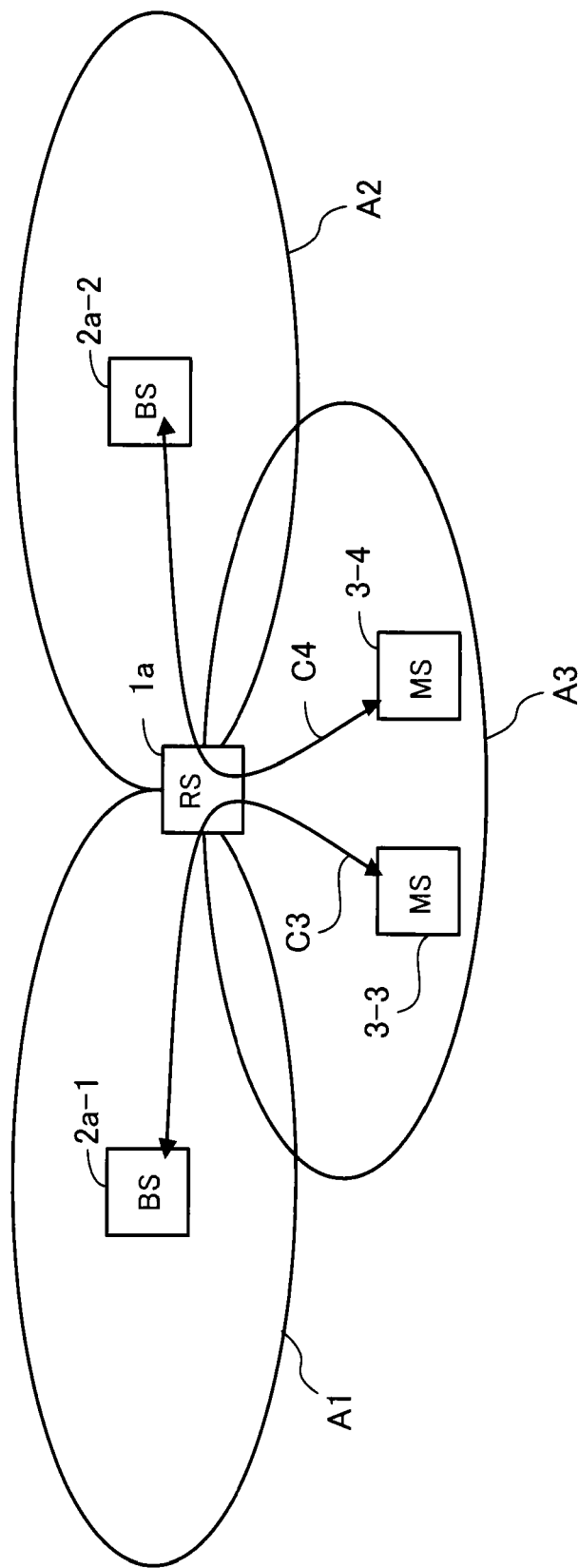
FIG. 21 is a view showing a state in which connections have been established in a network for radio relay communication.
Figure 22:
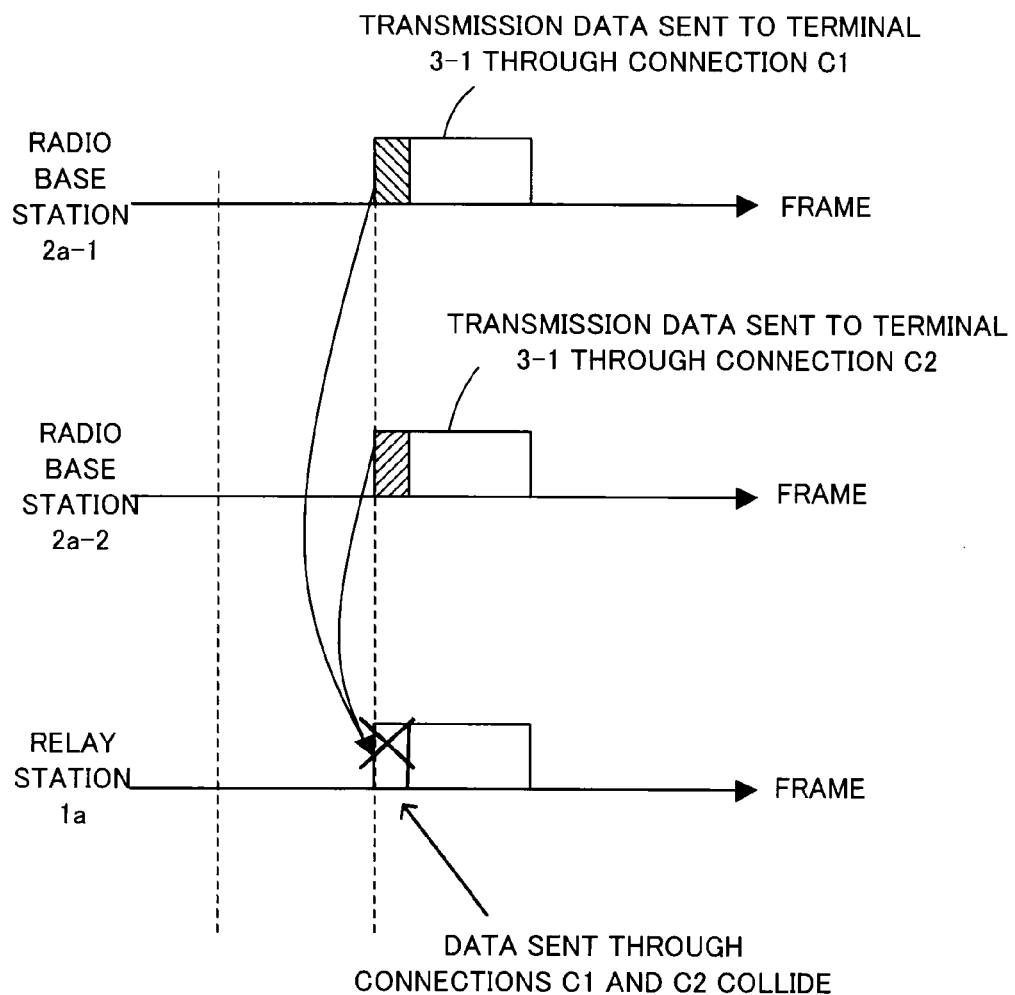
FIG. 22 is a view showing a data collision state.

It is assumed in the following description that the terminal 3-1 has established the two connections C1 and C2, as shown in FIG. 20. The same schedule control can be applied to a case where a plurality of terminals has established respective connections, as shown in FIG. 21.

FIG. 4 is a sequence chart showing schedule control for data transmission and receiving in a first case. In the first case, the relay station 1 instructs the radio base stations 2-1 and 2-2 to start and stop slot assignment in radio frames.

In this case, while one radio base station is performing slot assignment on a radio-frame basis or on an hourly basis, the other radio base station does not perform slot assignment. If a radio base station which does not perform slot assignment generates a packet to be sent to the destination, the packet is buffered or discarded.

Step S1: The terminal 3-1 establishes a connection C1 with the relay station 1. The relay station 1 manages the connection C1.

Step S2: The relay station 1 selects a connection-destination radio base station for each connection. As indexes used for selecting the radio base station, a received-signal strength indicator (RSSI), a carrier to interference and noise ratio (CINR), a radio-resource use rate at a base station, and the number of connections established, all of which are measured or collected for each radio base station, and traffic parameters, such as the request bandwidth and delay time requested by each connection, can be used. Depending on such a index, the relay station 1 select a radio base station. (For example, when CINR is used as an index, a radio base station having a good CINR is selected.) In the current case, the relay station 1 selects the radio base station 2-1 as the connection destination of the connection C1, and the connection C1 is established between the relay station 1 and the radio base station 2-1.

Step S3: The terminal 3-1 establishes a connection C2. The relay station 1 performs processing for selecting a radio base station in the same way as in step S2 to select the radio base station 2-2 as the connection destination for the connection C2. The connection C2 is established between the relay station 1 and the radio base station 2-2.

Since the connections C1 and C2 are connected to different radio base stations, which are the radio base stations 2-1 and 2-2, schedule control needs to be applied to slot assignment for the connection C1 at the radio base station 2-1 and for the connection C2 at the radio base station 2-2. Therefore, the relay station 1 determines the schedule.

The schedule can be determined according to the indexes measured and collected for each radio base station and the connection traffic parameters, which are used in the processing for selecting a radio base station.

When the value of each index for the radio base station 2-1 and that for the radio base station 2-2 have a ratio of 1:2, for example, a schedule can be arranged in which slot assignment is performed alternately for the radio base station 2-1 for one second or for one frame and for the radio base station 2-2 for two seconds or for two frames.

Step S4: To set the radio base station 2-1 to a slot assignment state and to set the radio base station 2-2 to a slot non-assignment state (hereinafter called a slot assignment stop state) according to the schedule, the relay station 1 sends a switching-to-start instruction to the radio base station 2-1 and a switching-to-stop instruction to the radio base station 2-2.

Step S5: When the radio base station 2-1 receives the switching-to-start instruction, the radio base station 2-1 assigns data to be sent to the terminal 3-1 to a slot and starts data transmission. When the radio base station 2-2 receives the switching-to-stop instruction, the radio base station 2-2 stops transmitting data to the terminal 3-1.

Step S6: Since the radio base station 2-1 has assigned the data for the connection C1 to the slot, data transmission and receiving are performed between the terminal 3-1 and the radio base station 2-1 via the relay station 1.

Step S7: When a predetermined period of time has elapsed, to set the radio base station 2-1 to a slot assignment stop state and to set the radio base station 2-2 to a slot assignment state, the relay station 1 sends a switching-to-stop instruction to the radio base station 2-1 and a switching-to-start instruction to the radio base station 2-2.

Step S8: When the radio base station 2-1 receives the switching-to-stop instruction, the radio base station 2-1 stops transmitting data to the terminal 3-1. When the radio base station 2-2 receives the switching-to-start instruction, the radio base station 2-2 assigns data to be sent to the terminal 3-1 to a slot and starts data transmission.

Step S9: Since the radio base station 2-2 has assigned the data for the connection C2 to the slot, data transmission and receiving are performed between the terminal 3-1 and the radio base station 2-2 via the relay station 1.

Since the indexes, which represent the states of the radio base stations, used in scheduling performed in step S3 change as time passes, the indexes may be measured as required to change the selection of a radio base station for each connection and the slot assignment schedule at the middle.

FIG. 5 is a sequence chart showing schedule control for data transmission and receiving in a second case. In FIG. 4, the radio base stations 2-1 and 2-2 perform slot switching according to switching instructions sent from the relay station 1 one by one. In the second case, once the radio base stations 2-1 and 2-2 receive switching conditions from the relay station 1, the radio base stations 2-1 and 2-2 autonomously change their slot assignment states according to the switching conditions.

A switching condition means the period or pattern of a data transmission start or a data-transmission stop controlled in units of frames at each radio base station. For example, the radio base stations 2-1 and 2-2 alternately switch a data transmission start and a data-transmission stop for the same number of frames. Alternatively, when the radio base station 2-1 has a lower degree of traffic congestion, the radio base station 2-1 transmits frames "a" times, and then the radio base station 2-2 transmits frames "b" times, where "a" is greater than "b".

Step S11: The relay station 1 sends switching-condition instructions to the radio base stations 2-1 and 2-2. As a switching condition, an offset from a start frame number or from the time when a switching-condition instruction is received, the effective period of an initial state of slot assignment, the effective period of slot assignment, or the effective period of slot assignment stop state is, for example, specified.

Step S12: When the radio base station 2-1 receives the switching-condition instruction, the radio base station 2-1 assigns data to be sent to the terminal 3-1 to a slot and starts data transmission. When the radio base station 2-2 receives the switching-condition instruction, the radio base station 2-2 stops transmitting data to the terminal 3-1.

Step S13: Since the radio base station 2-1 has assigned the data for the connection C1 to the slot, data transmission and receiving are performed between the terminal 3-1 and the radio base station 2-1 via the relay station 1.

Step S14: Based on the switching-condition instructions received in step S11, when a predetermined time has elapsed, the radio base stations 2-1 and 2-2 autonomously become a slot assignment stop state and a slot assignment state, respectively. The radio base station 2-1 stops transmitting data to the terminal 3-1, and the radio base station 2-2 starts transmitting data to the terminal 3-1.

Step S15: Since the radio base station 2-2 assigns data for the connection C2 to a slot, data transmission and receiving are performed between the terminal 3-1 and the radio base station 2-2 via the relay station 1.

In this way, once the radio base stations 2-1 and 2-2 receive switching-condition instructions from the relay station 1, they autonomously change their slot assignment even if the relay station 1 does not send a switching instruction any more.

In the case shown in FIG. 5, the switching-condition instructions specify that the radio base station 2-1 start with a slot assignment state and the radio base station 2-2 start with a slot assignment stop state. When a scheduled-time has elapsed, the radio base stations 2-1 and 2-2 change their slot assignment to the other states, respectively.

FIG. 6 is a sequence chart showing schedule control for data transmission and receiving in a third case. In the third case, as a more-detailed transmission schedule at the radio base stations 2-1 and 2-2, slot mapping conditions are specified for radio frames sent at the same timing by the radio base stations 2-1 and 2-2. More specifically, assuming that the radio base stations 2-1 and 2-2 send transmission frames f2-1 and f2-2 at the same timing, data is mapped such that a slot to which the radio base station 2-1 input data in the transmission frame f2-1 and a slot to which the radio base station 2-2 input data in the transmission frame f2-2 differ.

A slot mapping condition corresponds, for example, in orthogonal frequency division multiplexing access (OFDMA) frames used in WiMAX, to a burst area size, an assignment position in a frame, a zone partitioned in the OFDMA symbol direction, and a segment divided in the sub-channel direction (described later with reference to FIG. 10 to FIG. 12).

When slot assignment control is performed with a mapping condition specified in this way for a frame, a data-transmission waiting time generated when slot assignment is changed in units of frames is eliminated, thereby reducing a data remaining time at the radio base stations 2-1 and 2-2 and suppressing a delay time.

Step S21: The relay station 1 sends mapping-condition instructions to the radio base stations 2-1 and 2-2.

Step S22: The radio base stations 2-1 and 2-2 sets the mapping conditions in their stations.

Step S23: The radio base station 2-1 assigns data for the connection C1 to a slot, and data transmission and receiving are performed between the terminal 3-1 and the radio base station 2-1 via the relay station 1. The radio base station 2-2 assigns data for the connection C2 to a slot, and data transmission and receiving are performed between the terminal 3-1 and the radio base station 2-2 via the relay station 1. Since the slot position assigned by the radio base station 2-1 and the slot position assigned by the radio base station 2-2 differ in the transmission frames sent from the radio base stations 2-1 and 2-2 because of the mapping conditions, slot assignment does not need to be switched and data can be transmitted at the same timing.

In this way, the relay station 1 selects a radio base station for each connection and determines mapping conditions as a slot-assignment schedule, and then, the relay station 1 gives the mapping conditions to the radio base stations. Each radio base station holds the given mapping condition, and performs slot assignment in a radio frame according to the condition.

FIG. 7 is a sequence chart showing schedule control for data transmission and receiving in a fourth case. In the fourth case, in the method in which the radio base stations autonomously change their slot assignment according to switching conditions, the relay station 1 does not determine the switching conditions, but the relay station 1 asks the radio base stations 2-1 and 2-2 to determine the switching conditions, and the radio base stations 2-1 and 2-2 determine the switching conditions in coordination with each other.

Step S31: The relay station 1 selects the radio base stations 2-1 and 2-2 for the connections C1 and C2, respectively, and then, sends a switching-condition-decision request to the radio base station 2-1. This switching-condition decision request includes traffic parameters such as identification information on the connections C1 and C2, a required bandwidth, and a tolerable delay time. In FIG. 7, the relay station 1 sends a switching-condition-decision request to the radio base station 2-1. The request may be sent to the radio base station 2-2 or to both the radio base stations 2-1 and 2-2.

Step S32: The radio base station 2-1 receives the switching-condition-decision request, negotiates with the radio base station 2-2, and determines switching conditions between the radio base stations 2-1 and 2-2. As in the case shown in FIG. 5, each condition can, for example, be an offset from a start frame number or from the time when an instruction is received, the effective period of an initial state of slot assignment, the effective period of slot assignment, or the effective period of slot assignment stop state.

Step S33: The radio base stations 2-1 and 2-2 specify the determined switching conditions in their stations. The subsequent operations are the same as those in step S12 to step S15 in FIG. 5.

FIG. 8 is a sequence chart showing schedule control for data transmission and receiving in a fifth case. In the fifth case, in the method in which slot mapping conditions are specified for radio frames to be sent from the radio base stations 2-1 and 2-2 at the same timing, the relay station 1 does not determine the mapping conditions, but the relay station 1 asks the radio base stations 2-1 and 2-2 to determine the mapping conditions, and the radio base stations 2-1 and 2-2 determine the mapping conditions in coordination with each other.

Step S41: The relay station 1 selects the radio base stations 2-1 and 2-2 for the connections C1 and C2, respectively, and then, sends a mapping-condition-decision request to the radio base station 2-1. This mapping-condition decision request includes traffic parameters such as identification information on the connections C1 and C2, a required bandwidth, and a tolerable delay time. The mapping-condition-decision request may be sent to the radio base station 2-2 or to both the radio base stations 2-1 and 2-2.

Step S42: The radio base station 2-1 receives the mapping-condition-decision request, negotiates with the radio base station 2-2, and determines mapping conditions between the radio base stations 2-1 and 2-2. As in the case shown in FIG. 6, each condition can, for example, in OFDMA frames used in WiMAX, be a burst area size, an assignment position in a frame, a zone partitioned in the OFDMA symbol direction, and a segment divided in the sub-channel direction.

Step S43: The radio base stations 2-1 and 2-2 specify the determined mapping conditions in their stations. The subsequent operation is the same as that in step S23 in FIG. 6.

In the cases described with reference to FIG. 4, FIG. 5, and FIG. 7, the relay station 1 receives frames in which data is input, without any collision in the following way.

Figure 9:
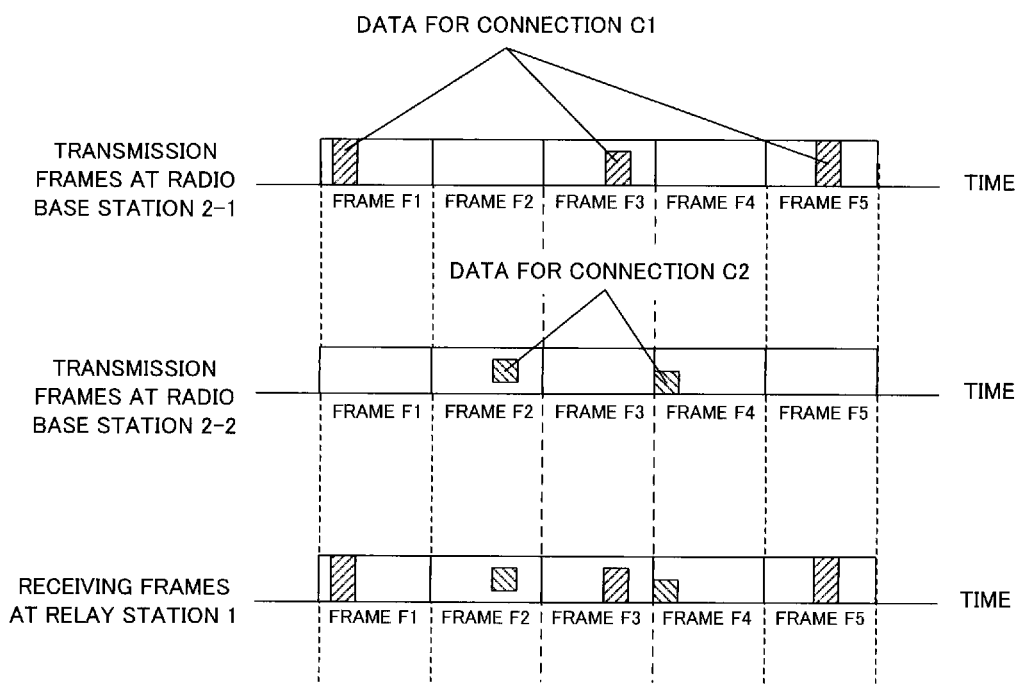
FIG. 9 is a view showing transmission frames at radio base stations and a receiving frame at the relay station.

FIG. 9 is a timing chart of transmission frames at the radio base stations 2-1 and 2-2 and receiving frames at the relay station 1. As shown in this figure, the relay station 1 receives frames in which data for the connections C1 and C2 is input, without any collision.

The radio base station 2-1 assigns data for the connection C1 to a slot in every other frame starting from a frame F1, and the radio base station 2-2 assigns data for the connection C2 to a slot in every other frame starting from a frame F2.

In this way, the data for the connection C1 and the data for the connection C2 are always transmitted in radio frames different in time. Therefore, even when the relay station 1 receives radio frames from the radio base stations 2-1 and 2-2, the data for the connection C1 and the data for the connection C2 do not collide.

The cycle of frames in which data for each connection is input and the number of frames continuously used may be specified as desired unless data from radio base stations collides with each other.

For example, data may be arranged such that data for the connection C1 is input in three consecutive frames, frames F1 to F3, and data for the connection C2 is input in two consecutive frames, frames F4 and F5. Alternatively, frames may be used such that frames F1 to F3 are not used for data transmission and receiving with the relay station 1 but used for a connection between each radio base station and the terminal 3-1 to be directly connected thereto; frame F4 is used for data for the connection C1; and frame F5 is used for data for the connection C2. When a radio base station does not have data for a connection, to be sent in an expected frame, the slot may be vacant, or the frame may be used for data for another connection.

In the current case, since a schedule for data transmission and receiving for each connection is controlled in units of frames, there is no special restrictions on the position of a slot to which data is assigned in each frame. Each radio base station can map data for the connection in a vacant slot in a controlled frame to which a slot can be assigned.

In the case shown in FIG. 9, burst areas (hatched portions) are made in vacant slots in OFDMA frames used in WiMAX, and data for each connection is mapped to burst areas. In the same way, mapping is also possible in OFDM frames.

In FIG. 9, uplink multiplexing and downlink multiplexing are not differentiated. In the same way as in FIG. 9, mapping is also possible for either time-division multiplexing (TDD) or frequency-division multiplexing (FDD).

In the mapping cases described with reference to FIG. 6 and FIG. 8, the relay station 1 receives frames in which data is input, without any collision in the following way.

Figure 10:
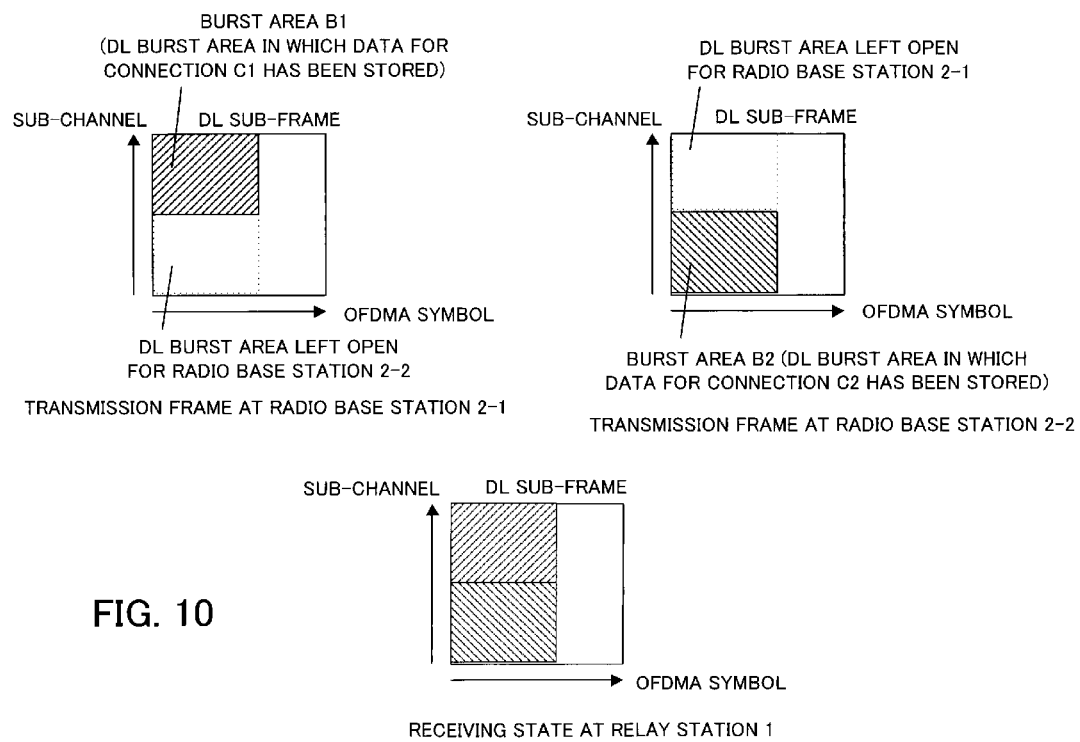
FIG. 10 is a view showing transmission frames at the radio base stations and a receiving frame at the relay station.
Figure 11:
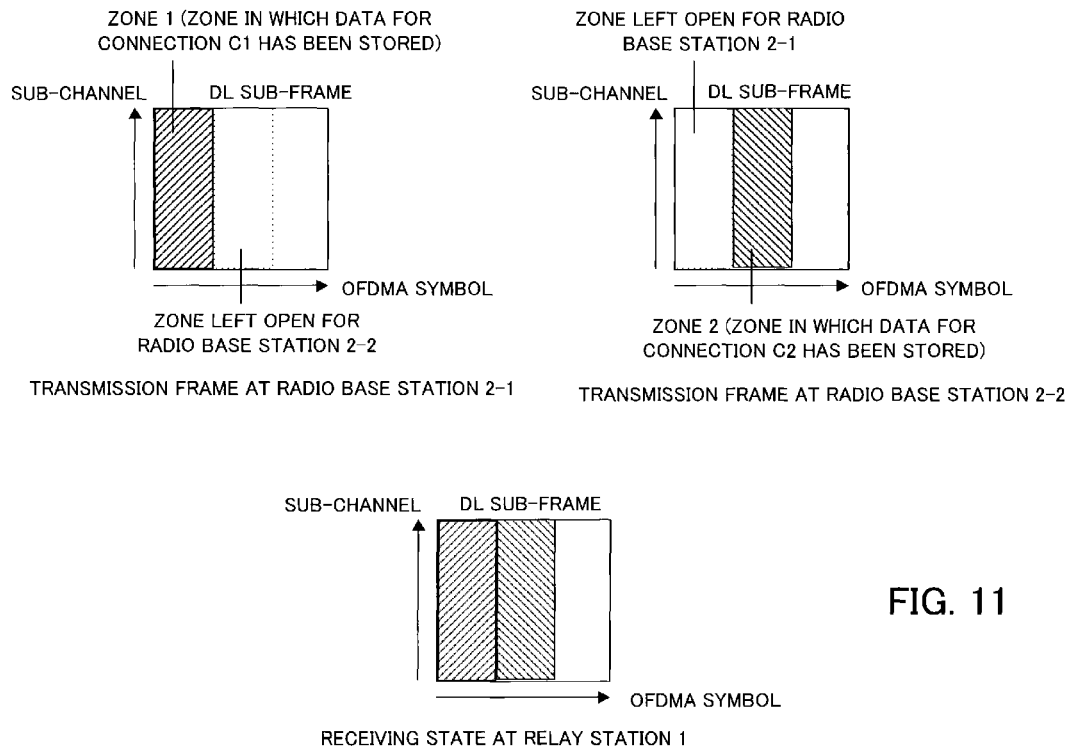
FIG. 11 is a view showing transmission frames at the radio base stations and a receiving frame at the relay station.
Figure 12:
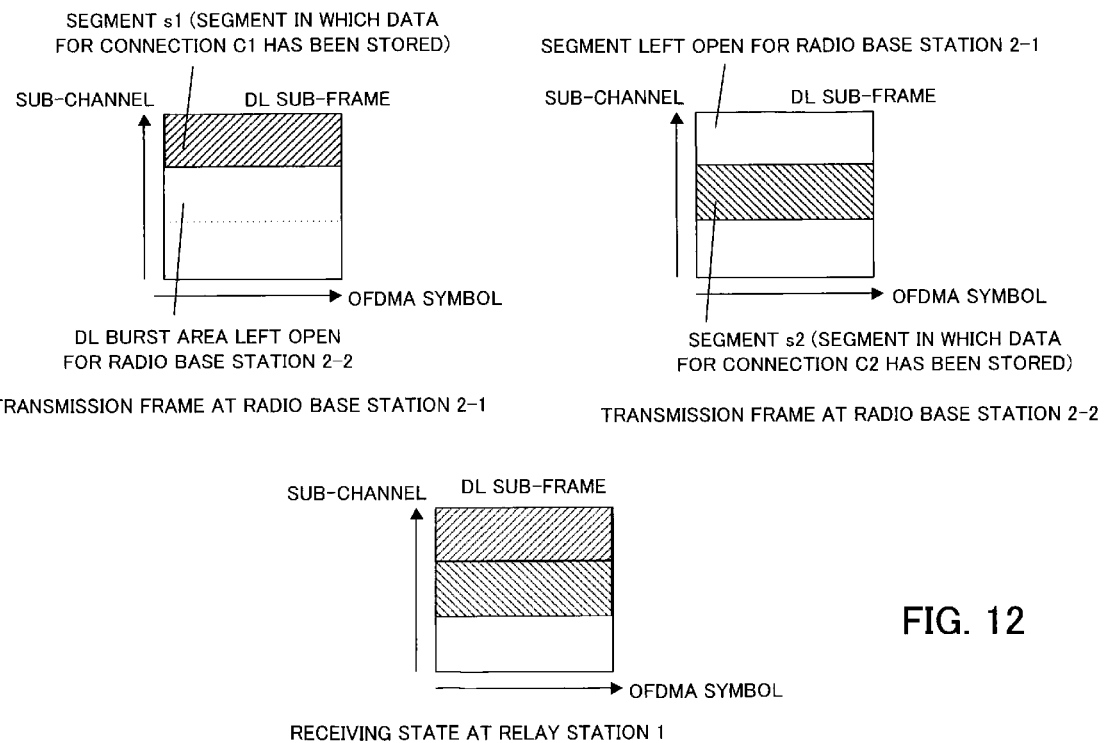
FIG. 12 is a view showing transmission frames at the radio base stations and a receiving frame at the relay station.

FIG. 10 to FIG. 12 show OFDMA frames used in WiMAX with control information specified at the top of each frame being omitted such as a preamble, a frame control header (FCH), DL-MAP, and UL-MAP.

Mapping is performed for downlink (DL) sub-frames in time-division multiplexing. The same mapping can also be performed for uplink sub-frames. The vertical axis in each frame indicates the logical sub-channel number and the horizontal axis indicates the OFDMA symbol number.

FIG. 10 shows mapping states in transmission frames at the radio base stations 2-1 and 2-2 and a receiving frame at the relay station 1. This case shows that downlink burst areas are formed in down-link sub-frames in OFDMA frames and data is mapped in the burst areas.

A downlink burst area is defined by a size represented by a starting point in the downlink sub-frame and a value obtained by multiplying the number of sub-channels by the number of OFDMA symbols. A radio base station can generate any burst areas in each frame by scheduling.

The radio base stations 2-1 and 2-2 respectively generate a burst area B1 and a burst area B2 as downlink burst areas at hatched portions in transmission frames. The radio base stations 2-1 and 2-2 understand the regions where the burst areas B1 and B2 are to be generated. Therefore, the radio base station 2-1 leaves open the region where the burst area B2 is to be generated by the radio base station 2-2, without generating other burst areas. The radio base station 2-2 also leaves open the region where the burst area B1 is to be generated by the radio base station 2-1, without generating other burst areas.

In this way, burst-area generation is controlled at each radio base station and transmission frames are generated. Therefore, even when the relay station 1 receives radio frames from the radio base station 2-1 and the radio base station 2-2 at the same time, data for the connection C1 and data for the connection C2 do not collide and are successfully received.

The generation method of an uplink burst area in an uplink sub-frame differs from that of a downlink burst area in a downlink sub-frame. An uplink burst area is not necessarily a rectangle represented by a value obtained by multiplying the number of sub-channels by the number of OFDMA symbols, unlike a downlink burst area. However, when a region where each radio base station generates an uplink burst area is understood and the same slot is not used, assigned uplink burst areas do not overlap for the relay station and data collision is avoided, in the same way as for a downlink.

FIG. 11 shows mapping states in transmission frames at the radio base stations 2-1 and 2-2 and a receiving frame at the relay station 1. FIG. 11 shows a case in which a plurality of zones is generated in a downlink sub-frame in an OFDMA frame and data for each connection is mapped in an expected zone.

A zone is generated by dividing a sub-frame by the number of OFDMA symbols. Data is stored in a downlink burst area generated in each zone in the same way as shown in FIG. 10, but a downlink burst area is omitted in FIG. 11.

The radio base stations 2-1 and 2-2 respectively generate a zone 1 and a zone 2 at hatched portions in transmission frames. The radio base stations 2-1 and 2-2 understand the zones where data to be sent to the relay station 1 is to be stored. Therefore, the radio base station 2-1 leaves open the zone where the radio base station 2-2 will store data for the connection C2, without generating other burst areas. The radio base station 2-2 also leaves open the zone where the radio base station 2-1 will store data for the connection C1, without generating other burst areas.

In this way, burst-area generation is controlled at each radio base station and transmission frames are generated. Therefore, even when the relay station 1 receives radio frames from the radio base station 2-1 and the radio base station 2-2 at the same time, the data for the connection C1 and the data for the connection C2 do not collide and are successfully received. Zones can also be defined in uplink sub-frames, and the same control can be applied to zones as in downlink sub-frames.

FIG. 12 shows mapping states in transmission frames at the radio base stations 2-1 and 2-2 and a receiving frame at the relay station 1. FIG. 12 shows a case in which a plurality of segments is generated in a downlink sub-frame in an OFDMA frame and data for each connection is mapped in an expected segment.

A segment is a region generated by dividing a sub-frame by a determined number of sub-channels. Data is stored in a downlink burst area generated in each segment in the same way as shown in FIG. 10, but a downlink burst area is omitted in FIG. 12.

The radio base stations 2-1 and 2-2 understand that data for the connection C1 and data for the connection C2 are to be respectively stored in a segment s1 and a segment s2 generated at hatched portions in transmission frames. Therefore, the radio base station 2-1 leaves open the segment where the radio base station 2-2 will store the data for the connection C2, without generating other burst areas. The radio base station 2-2 also leaves open the segment where the radio base station 2-1 will store the data for the connection C1, without generating other burst areas.

In this way, burst-area generation is controlled at each radio base station and transmission frames are generated. Therefore, even when the relay station 1 receives radio frames from the radio base station 2-1 and the radio base station 2-2 at the same time, the data for the connection C1 and the data for the connection C2 do not collide and are successfully received. Segments can be defined in uplink sub-frames in the same way, and the same control can be applied to segments as in downlink sub-frames.

Next, in the method in which the relay station 1 sends switching instructions one by one to the radio base stations as shown in FIG. 4, a procedure obtained by extending Fast BS Switching, which is a handover procedure in WiMAX, will be described with reference to FIG. 13.

Figure 13:
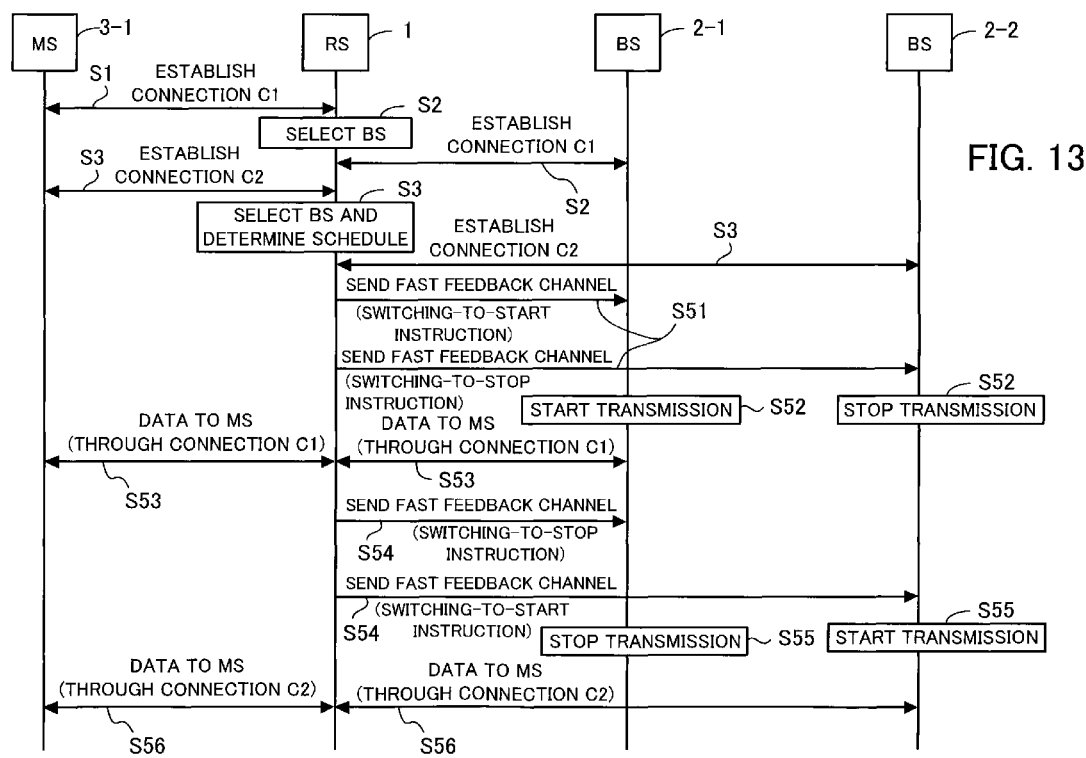
FIG. 13 is a sequence chart showing another schedule control for data transmission and receiving.

FIG. 13 is a sequence chart showing schedule control for data transmission and receiving. The connections C1 and C2 in the figure are also called service flows in WiMAX. When the connections C1 and C2 are established, the relay station 1 selects the radio base stations 2-1 and 2-2, and then, determines a data-transmission schedule for the radio base stations 2-1 and 2-2. In the same way as in FIG. 4, it is assumed here that the radio base stations 2-1 and 2-2 alternately perform data transmission at constant intervals in the schedule.

Step S51: To set the radio base station 2-1 to a slot assignment state and to set the radio base station 2-2 to a slot assignment stop state according to the schedule, the relay station 1 sends a switching-to-start instruction to the radio base station 2-1 and a switching-to-stop instruction to the radio base station 2-2.

In the current case, specifically, the relay station 1 instructs the radio base stations 2-1 and 2-2 to start and stop slot assignment for the connections C1 and C2, respectively, with the use of fast feedback channels. A fast feedback channel is a slot assigned periodically to immediately send an instruction, such as a notice of a channel quality indicator (CQL) or control information, including a request for changing the anchor radio base station for handover, to a radio base station. In the current case, the relay station 1 instructs the radio base stations 2-1 and 2-2 to start and stop slot assignment as requests.

Step S52: When the radio base station 2-1 receives the fast feedback channel (switching-to-start instruction), the radio base station 2-1 starts transmitting data to the terminal 3-1. When the radio base station 2-2 receives the fast feedback channel (switching-to-stop instruction), the radio base station 2-2 stops transmitting data to the terminal 3-1.

Step S53: Since the radio base station 2-1 assigns data for the connection C1 to a slot, data transmission and receiving are performed between the terminal 3-1 and the radio base station 2-1 via the relay station 1.

Step S54: When a predetermined period of time has elapsed, to set the radio base station 2-1 to a slot assignment stop state and to set the radio base station 2-2 to a slot assignment state, the relay station 1 sends a fast feedback channel (switching-to-stop instruction) to the radio base station 2-1 and a fast feedback channel (switching-to-start instruction) to the radio base station 2-2.

Step S55: When the radio base station 2-1 receives the switching-to-stop instruction, the radio base station 2-1 stops transmitting data to the terminal 3-1. When the radio base station 2-2 receives the switching-to-start instruction, the radio base station 2-2 starts transmitting data to the terminal 3-1.

Step S56: Since the radio base station 2-2 assigns data for the connection C2 to a slot, data transmission and receiving are performed between the terminal 3-1 and the radio base station 2-2 via the relay station 1.

Next, in the method in which the relay station 1 sends switching instructions one by one to the radio base stations as shown in FIG. 13, another procedure obtained by extending Fast BS Switching, which is a handover procedure in WiMAX, will be described with reference to FIG. 14. Whereas, in FIG. 13, the relay station 1 sends slot assignment start and stop instructions to both the radio base stations 2-1 and 2-2 with the use of fast feedback channels, control is made in the case shown in FIG. 14 such that the relay station 1 sends control information (fast feedback channel) that includes the identifier of a radio base station to be instructed to start slot assignment, to a radio base station to be instructed to stop slot assignment.

Figure 14:
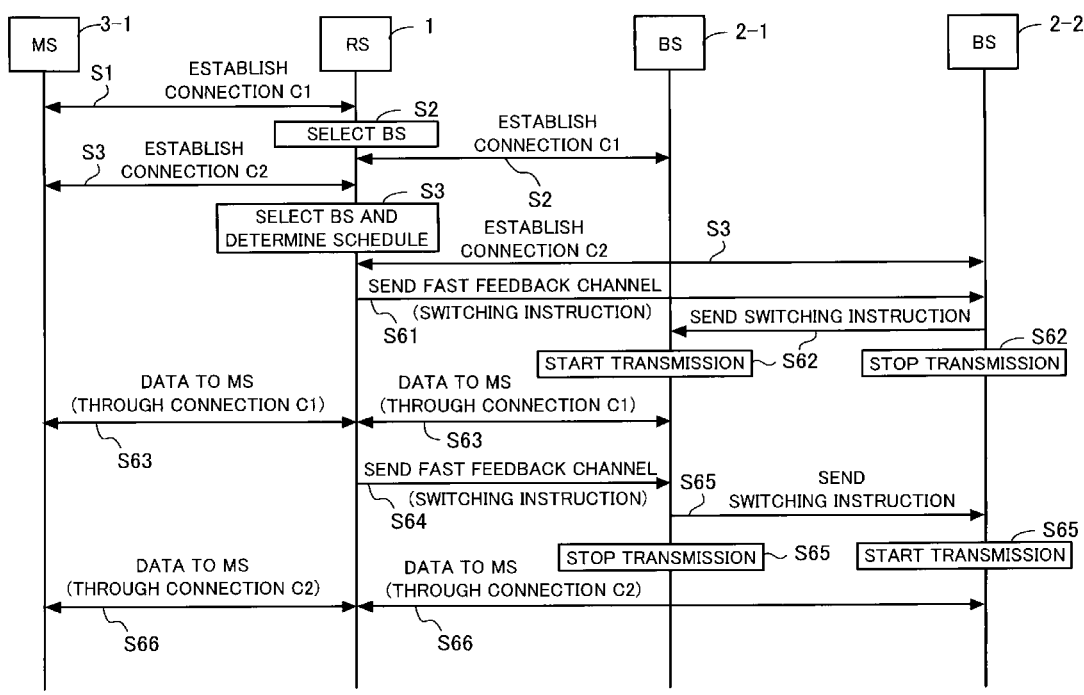
FIG. 14 is a sequence chart showing another schedule control for data transmission and receiving.

FIG. 14 is a sequence chart showing schedule control for data transmission and receiving.

Step S61: To set the radio base station 2-1 to a slot assignment state and to set the radio base station 2-2 to a slot assignment stop state according to the schedule, the relay station 1 sends a fast feedback channel that includes the identifier of the radio base station 2-1 and switching instruction information to the radio base station 2-2.

Step S62: When the radio base station 2-2 receives the fast feedback channel, the radio base station 2-2 stops slot assignment therein, and sends a switching instruction (new independent message) to the radio base station 2-1 to start slot assignment. The radio base station 2-1 starts slot assignment. Control is made such that stating and stopping slot assignment at the radio base stations 2-1 and 2-2 are switched at the same timing.

Step S63: Since the radio base station 2-1 assigns data for the connection C1 to a slot, data transmission and receiving are performed between the terminal 3-1 and the radio base station 2-1 via the relay station 1.

Step S64: When a predetermined period of time has elapsed, to set the radio base station 2-1 to a slot assignment stop state and to set the radio base station 2-2 to a slot assignment state, the relay station 1 sends a fast feedback channel that includes the identifier of the radio base station 2-2 and switching instruction information to the radio base station 2-1.

Step S65: When the radio base station 2-1 receives the fast feedback channel, the radio base station 2-1 stops slot assignment therein, and sends a switching instruction (new independent message) to the radio base station 2-2 to start slot assignment. The radio base station 2-1 starts slot assignment. Control is made such that stating and stopping slot assignment at the radio base stations 2-1 and 2-2 are switched at the same timing.

Step S66: Since the radio base station 2-2 assigns data for the connection C2 to a slot, data transmission and receiving are performed between the terminal 3-1 and the radio base station 2-2 via the relay station 1.

Next, in the method in which the relay station 1 asks each radio base station to determine switching, and then, radio base stations autonomously determine switching conditions and perform switching, as shown in FIG. 7, a procedure obtained by extending Fast BS Switching, which is a handover procedure in WiMAX, will be described with reference to FIG. 15.

Figure 15:
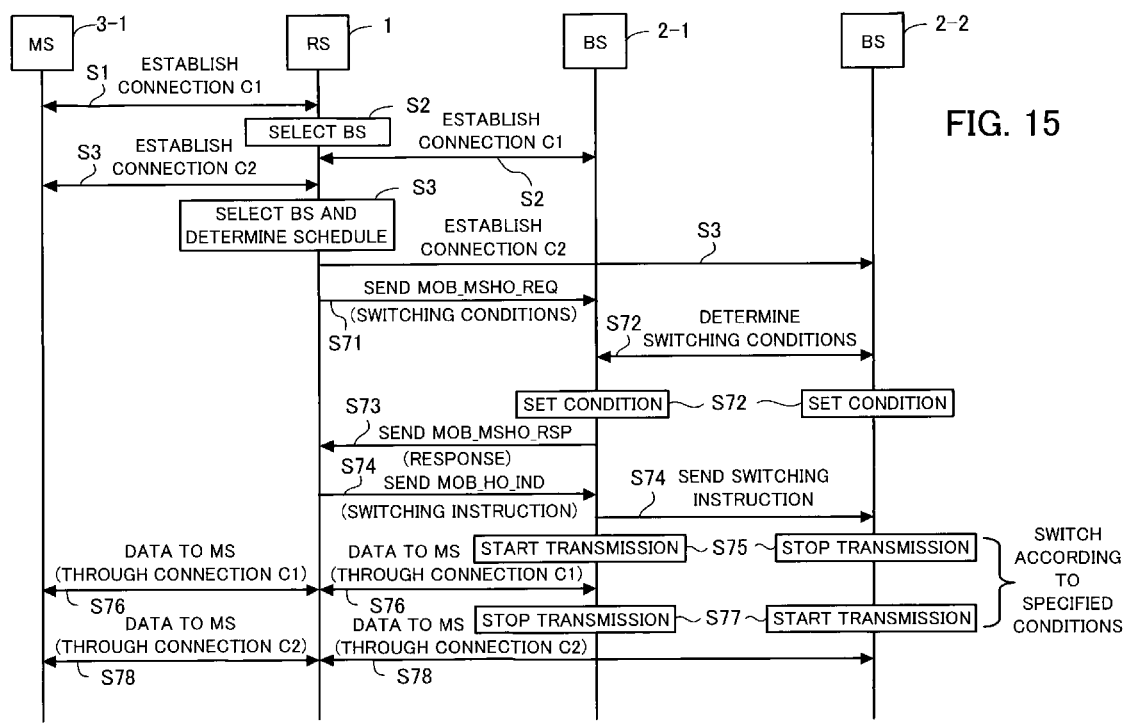
FIG. 15 is a sequence chart showing another schedule control for data transmission and receiving.

FIG. 15 is a sequence chart showing schedule control for data transmission and receiving.

Step S71: The relay station 1 sends a handover message MOB MSHO REQ that includes determined switching conditions and the identifier of the radio base station 2-2, to the radio base station 2-1.

Step S72: The radio base station 2-1 sends a switching-condition message (new independent message) to the radio base station 2-2 and negotiates with it. Then, the radio base stations 2-1 and 2-2 set the switching conditions therein.

Step S73: The radio base station 2-1 sends back an MOB MSHO RSP to the relay station 1 in response.

Step S74: The relay station 1 sends an MOB HO IND message for specifying handover execution that includes a switching instruction, to the radio base station 2-1. The radio base station 2-1 receives the instruction and sends a switching-instruction message (new independent message) to the radio base station 2-2.

Step S75: When the radio base station 2-1 receives the switching instruction by the MOB HO IND, the radio base station 2-1 starts transmitting data to the terminal 3-1. When the radio base station 2-2 receives the switching-instruction message from the radio base station 2-1, the radio base station stops transmitting data to the terminal 3-1.

Step S76: Since the radio base station 2-1 assigns data for the connection C1 to a slot, data transmission and receiving are performed between the terminal 3-1 and the radio base station 2-1 via the relay station 1.

Step S77: Based on the switching conditions, when a predetermined period of time has elapsed, the radio base stations 2-1 and 2-2 autonomously perform operations such that the radio base station 2-1 becomes a slot assignment stop state and the radio base station 2-2 becomes a slot assignment state. The radio base station 2-1 stops transmitting data to the terminal 3-1, and the radio base station 2-2 starts transmitting data to the terminal 3-1.

Step S78: Since the radio base station 2-2 assigns data for the connection C2 to a slot, data transmission and receiving are performed between the terminal 3-1 and the radio base station 2-2 via the relay station 1.

Next, in the method in which the relay station 1 specifies a mapping condition for each radio base station, as shown in FIG. 6, a case in which a control procedure according to the present invention is applied to Macro Diversity Handover, which is a handover procedure in WiMAX, will be described with reference to FIG. 16.

Figure 16:
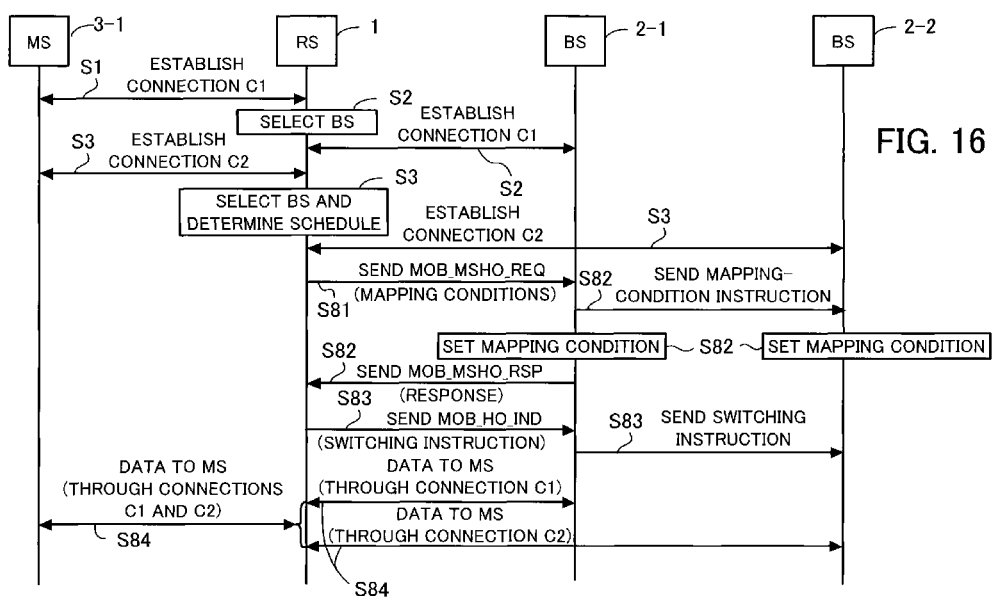
FIG. 16 is a sequence chart showing another schedule control for data transmission and receiving.

FIG. 16 is a sequence chart showing schedule control for data transmission and receiving.

Step S81: The relay station 1 sends a handover message MOB MSHO REQ that includes the mapping conditions determined according to a schedule and the identifier of the radio base station 2-2, to the radio base station 2-1.

Step S82: The radio base station 2-1 sends a mapping-condition message (new independent message) to the radio base station 2-2. When the radio base stations 2-1 and 2-2 set the mapping conditions therein, the radio base station 2-1 sends back an MOB MSHO RSP to the relay station 1 in response.

Step S83: The relay station 1 sends an MOB HO IND message for specifying handover execution that includes a switching instruction, to the radio base station 2-1. The radio base station 2-1 receives the instruction from the relay station 1 and sends a switching-instruction message (new independent message) to the radio base station 2-2.

Step S84: The radio base stations 2-1 and 2-2 operate according to the set mapping conditions. The radio base station 2-1 assigns data for the connection C1 to a slot, and data transmission and receiving are performed between the terminal 3-1 and the radio base station 2-1 via the relay station 1. The radio base station 2-2 assigns data for the connection C2 to a slot (slot different from the slot used by the radio base station 2-1), and data transmission and receiving are performed between the terminal 3-1 and the radio base station 2-2 via the relay station 1.

Next, in the method in which the relay station 1 asks each radio base station to determine a mapping condition, as shown in FIG. 8, a case in which a control procedure according to the present invention is applied to Macro Diversity Handover, which is a handover procedure in WiMAX, will be described with reference to FIG. 17.

Figure 17:
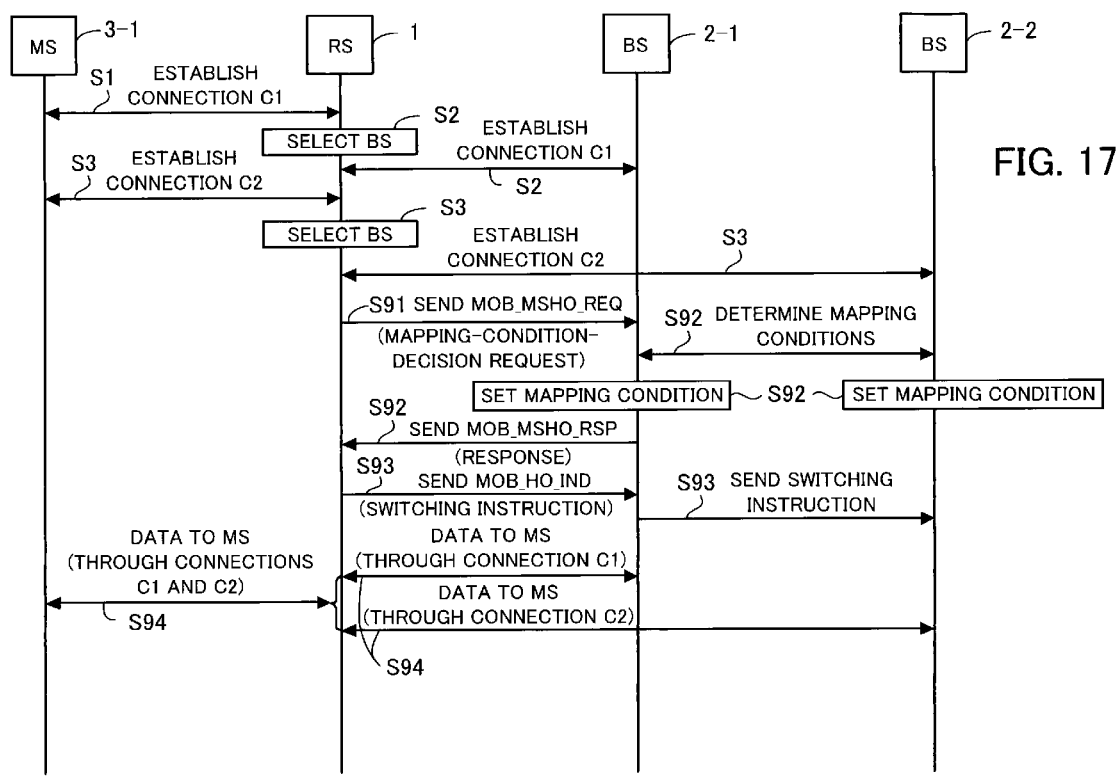
FIG. 17 is a sequence chart showing another schedule control for data transmission and receiving.
Figure 18:
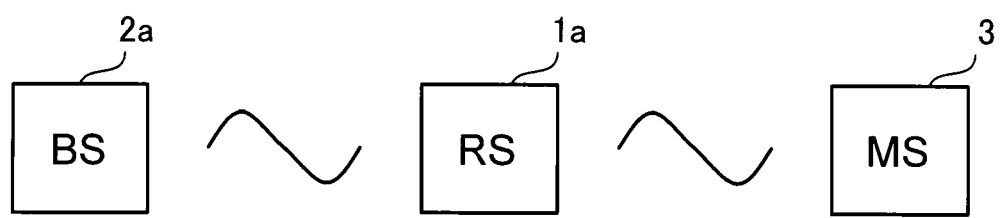
FIG. 18 is a view showing an outline of radio relay communication.
Figure 19:
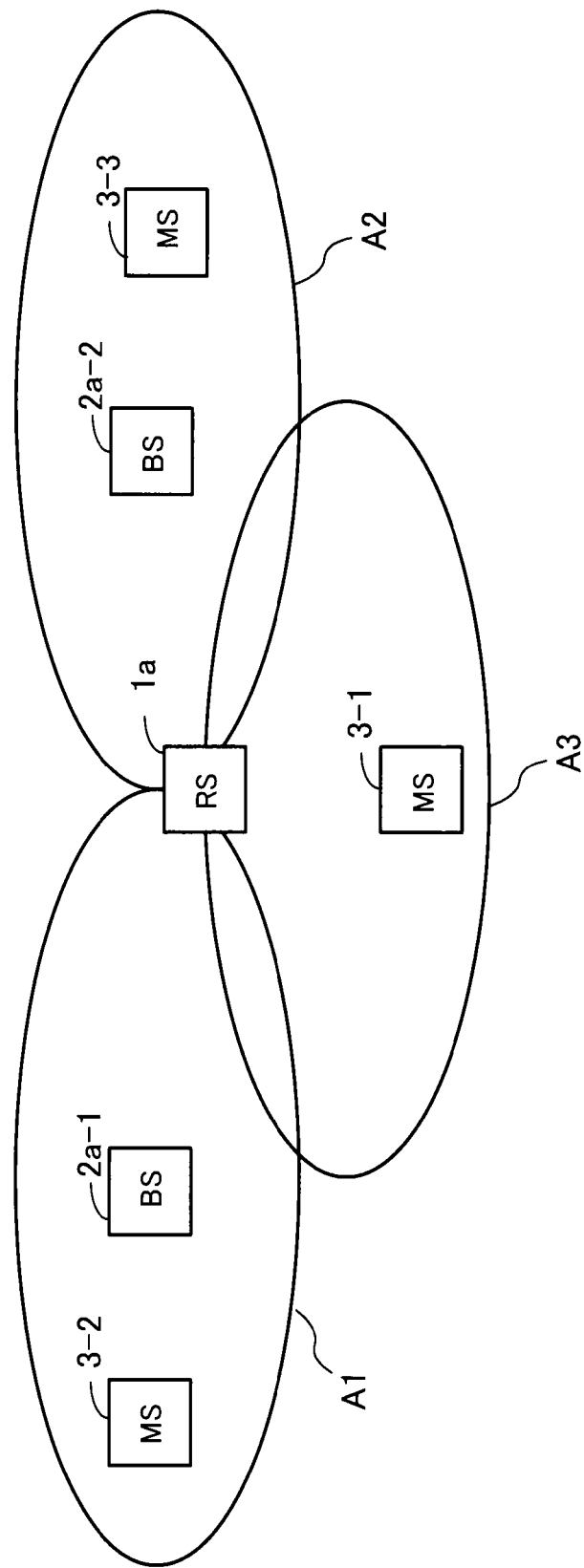
FIG. 19 is a view showing a network for radio relay communication.

FIG. 17 is a sequence chart showing schedule control for data transmission and receiving. When the connections C1 and C2 are established, the relay station 1 selects radio base stations 2-1 and 2-2. Then, the relay station 1 asks the radio base stations 2-1 and 2-2 to determine mapping conditions for data slot assignment in the radio base stations 2-1 and 2-2.

Step S91: The relay station 1 sends a handover message MOB MSHO REQ that includes a mapping-condition request and the identifier of the radio base station 2-2, to the radio base station 2-1.

Step S92: The radio base station 2-1 determines mapping conditions and sends a mapping-condition message (new independent message) to the radio base station 2-2. When the radio base stations 2-1 and 2-2 set the mapping conditions therein, the radio base station 2-1 sends back an MOB MSHO RSP to the relay station 1 in response.

Step S93: The relay station 1 sends an MOB HO IND message for specifying handover execution that includes a switching instruction, to the radio base station 2-1. The radio base station 2-1 receives the instruction from the relay station 1 and sends a switching-instruction message (new independent message) to the radio base station 2-2.

Step S94: The radio base stations 2-1 and 2-2 operate according to the set mapping conditions. The radio base station 2-1 assigns data for the connection C1 to a slot, and data transmission and receiving are performed between the terminal 3-1 and the radio base station 2-1 via the relay station 1. The radio base station 2-2 assigns data for the connection C2 to a slot (slot different from the slot used by the radio base station 2-1), and data transmission and receiving are performed between the terminal 3-1 and the radio base station 2-2 via the relay station 1.

According to the structures and operations described above, the present invention has the following advantages (a) to (e).

(a) Since a schedule for data transmission and receiving at a plurality of radio base stations is controlled, when a relay station relays data with the plurality of radio base stations, data transmission and receiving can be performed successfully.

(b) Since a radio base station suited to a connection is selected according to a connection state (radio channel quality and a radio-resource use rate) between the radio base station and a relay station, the radio resource can be efficiently used.

(c) Since radio base stations autonomously switch data transmission and receiving, the number of switching-instruction messages sent from a relay station is reduced, thereby saving the radio resource.

(d) Since data mapping is applied to different slots in radio frames to be sent from a plurality of radio base stations at the same timing in a schedule for data transmission and receiving at the plurality of radio base stations, the buffer remaining time of data and the data discarding rate are reduced at the plurality of radio base stations.

(e) Since radio base stations determine a schedule for data transmission and receiving and control autonomous switching of data transmission and receiving, the manufacturing cost of a relay station is reduced. In addition, the number of control messages is reduced between the relay station and the radio base stations, thereby saving the radio resources.

In a radio communication system according to the present invention, a plurality of radio base stations each includes a scheduler for arranging a schedule of assignment of a slot into which data is to be inserted in a radio frame, and a relay station includes a scheduler control section for giving an instruction of the schedule to the scheduler. The scheduler control section gives the instruction to the scheduler so as not to generate duplicate slot assignment, in which the whole or a part of data is assigned to the same slot in radio frames sent at the same timing. In this way, when the relay station performs radio relay communication with the plurality of radio base stations, control can be made such that transmission and receiving data is prevented from colliding with each other, thereby improving radio communication quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A radio communication system for performing relay communication by radio, comprising:
   a plurality of radio base stations each comprising a scheduler to arrange a schedule of assignment of a slot into which data is to be inserted in a radio frame;
   a terminal to perform communication with at least one of the radio base stations through a connection; and
   a relay station to perform relay forwarding of the radio frame exchanged through the connection, the relay station comprising a scheduler control section to give an instruction of the schedule to the scheduler,
   wherein the scheduler control section gives the instruction to the scheduler so as not to generate duplicate slot assignment, in which the whole or a part of data is assigned to the same slot in radio frames to be sent at same timing;
   wherein the scheduler control section sends a request for determining a switching condition for slot assignment to at least one of the plurality of radio base stations; and
   once the scheduler receives the request for determining a switching condition, negotiation is made among the plurality of radio base stations to determine the switching condition, and the scheduler performs scheduling according to the switching condition determined among the plurality of radio base stations, so as not to generate the duplicate slot assignment when the radio frame is sent, to implement autonomous slot assignment among the plurality of radio base stations.

2. The radio communication system according to claim 1, wherein the scheduler control section gives the instruction to the scheduler such that only one of the plurality of radio base stations performs slot assignment and the other radio base stations stop slot assignment at transmission timing of the radio frame.

3. The radio communication system according to claim 1, wherein the scheduler control section determines a switching condition for slot assignment and sends the switching condition to the plurality of radio base stations; and
   once the scheduler receives the switching condition, the scheduler performs scheduling according to the switching condition so as not to generate the duplicate slot assignment when the radio frame is sent, to implement autonomous slot assignment among the plurality of radio base stations.

4. The radio communication system according to claim 1, wherein, when the plurality of radio base stations are n radio base stations that send data D1 to Dn in radio frames f1 to fn, respectively, the scheduler control section gives a data mapping condition such that n slots to which the data D1 to Dn is mapped are all different in the radio frames f1 to fn to be sent by the n radio base stations at the same timing, so as not to generate the duplicate slot assignment.

5. The radio communication system according to claim 1, wherein, when the plurality of radio base stations are n radio base stations that send data D1 to Dn in radio frames f1 to fn, respectively, the scheduler control section sends a request for determining a data mapping condition to at least one of the plurality of radio base stations; and once the scheduler receives the request for determining a data mapping condition, negotiation is made among the n radio base stations to determine the data mapping condition, and the scheduler performs scheduling in which n slots to which the data D1 to Dn is mapped are all different in the radio frames f1 to fn to be sent by the n radio base stations at the same timing, according to the data mapping condition determined among the n radio base stations, so as not to generate the duplicate slot assignment when the radio frame is sent, to implement autonomous slot assignment among the n radio base stations.

6. The radio communication system according to claim 1, wherein the relay station measures communication and connection states with the plurality of radio base stations, selects at least one of the plurality of radio base stations which has a successful measured value, establishes the connection with the selected at least one of the plurality of radio base stations, and manages the connection.

7. A radio base station for performing radio communication, comprising:

a receiving section to receive a schedule instruction from a relay station to perform relay forwarding of a radio frame; and a scheduler to arrange a schedule of assignment of a slot into which data is to be inserted in a radio frame, according to the schedule instruction so as not to generate duplication slot assignment, in which the whole or a part of data is assigned to the same slot in radio frames to be sent at same timing;

wherein once the scheduler receives a request for determining a slot-assignment switching condition from the relay station, negotiation is made among a plurality of the radio base stations to determine the switching condition, and the scheduler performs scheduling according to the switching condition determined among the plurality of the radio base stations, so as not to generate the duplicate slot assignment when the radio frame is sent, to implement autonomous slot assignment among the plurality of the radio base stations.

8. The radio base station according to claim 7, wherein once the scheduler receives a slot-assignment switching condition determined and sent by the relay station, the scheduler performs scheduling according to the switching condition so as not to generate the duplicate slot assignment when the radio frame is sent, to implement autonomous slot assignment with a plurality of the radio base stations.

9. The radio base station according to claim 7, wherein, when a plurality of the radio base stations are n radio base stations that send data D1 to Dn in radio frames f1 to fn, respectively, if the scheduler receives a data mapping condition determined and sent by the relay station, the scheduler performs mapping according to the data mapping condition such that n slots to which the data D1 to Dn is mapped are all different in the radio frames f1 to fn to be sent by the n radio base stations at the same timing, so as not to generate the duplicate slot assignment.

10. The radio base station according to claim 7, wherein, when a plurality of the radio base stations are n radio base stations that send data D1 to Dn in radio frames f1 to fn, respectively, if the scheduler receives a request for determining a data mapping condition from the relay station, negotiation is made among the n radio base stations to determine the data mapping condition, and the scheduler performs scheduling in which n slots to which the data D1 to Dn is mapped are all different in the radio frames f1 to fn to be sent by the n radio base stations at the same timing, according to the data mapping condition determined among the n radio base stations, so as not to generate the duplicate slot assignment when the radio frame is sent, to implement autonomous slot assignment among the n radio base stations.

11. A relay station for performing relay communication by radio, comprising:

a scheduler control section to give an instruction to a plurality of radio base stations when the plurality of radio base stations send data through connections, so as not to generate duplicate slot assignment, in which the whole or a part of data is assigned to the same slot in radio frames sent at same timing; and a transmission section to transmit an instruction signal generated by the scheduler control section to the plurality of radio base stations;

wherein the scheduler control section sends a request for determining a slot-assignment switching condition to at least one of the plurality of radio base stations such that negotiation is autonomously made among the plurality of radio base stations to determine the switching condition for slot assignment and scheduling is performed according to the switching condition so as not to generate the duplicate slot assignment.

12. The relay station according to claim 11, wherein the scheduler control section gives the instruction to the plurality of radio base stations such that only one of the plurality of radio base stations performs slot assignment and the other radio base stations stop slot assignment at transmission timing of the radio frames.

13. The relay station according to claim 11, wherein the scheduler control section determines a switching condition so as not to generate the duplicate slot assignment, to implement autonomous slot assignment among the plurality of radio base stations, and sends the switching condition to the plurality of radio base stations.

14. The relay station according to claim 11, wherein, when the plurality of radio base stations are n radio base stations that send data D1 to Dn in radio frames f1 to fn, respectively, the scheduler control section gives a data mapping condition such that n slots to which the data D1 to Dn is mapped are all different in the radio frames f1 to fn to be sent by the n radio base stations at the same timing, so as not to generate the duplicate slot assignment.

15. The relay station according to claim 11, wherein, when the plurality of radio base stations are n radio base stations that send data D1 to Dn in radio frames f1 to fn, respectively, the scheduler control section sends a request for determining a data mapping condition to at least one of the plurality of radio base stations such that negotiation is autonomously made among the plurality of radio base stations to determine the data mapping condition and scheduling is performed in which n slots to which the data D1 to Dn is mapped are all different in the radio frames f1 to fn to be sent by the n radio base stations at the same timing, according to the data mapping condition.

16. The relay station according to claim 11, further comprising:
a measurement section to measure communication and connection states with the plurality of radio base stations;
a radio-base-station selection section to select at least one of the plurality of radio base stations which has a successful measured value; and
a connection management section to establish the connection with the selected at least one of the plurality of radio base stations, and to manage the connection.

* * * * *